US012649432B2

(12) United States Patent
Yamazaki

(10) Patent No.: US 12,649,432 B2
(45) Date of Patent: Jun. 9, 2026

(54) SHOCK ABSORPTION DEVICE

(71) Applicant: Daicel Corporation, Osaka (JP)

(72) Inventor: Masayuki Yamazaki, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 379 days.

(21) Appl. No.: 18/278,407

(22) PCT Filed: Feb. 18, 2022

(86) PCT No.: PCT/JP2022/006535

§ 371 (c)(1),
(2) Date: Aug. 23, 2023

(87) PCT Pub. No.: WO2022/181462

PCT Pub. Date: Sep. 1, 2022

(65) Prior Publication Data

US 2024/0132006 A1 Apr. 25, 2024
US 2024/0227710 A9 Jul. 11, 2024

(30) Foreign Application Priority Data

Feb. 24, 2021 (JP) ................................. 2021-027042

(51) Int. Cl.
B60R 19/34 (2006.01)

(52) U.S. Cl.
CPC .................................... B60R 19/34 (2013.01)

(58) Field of Classification Search
CPC ......... B60R 19/24; B60R 19/34; B60R 19/36; B60R 2019/262; B62D 21/152; F16F 7/12; F16F 7/125

See application file for complete search history.

(56) References Cited

U.S. PATENT DOCUMENTS 6,135,251 A 10/2000 Hartlieb et al.
6,179,356 B1 1/2001 Hartlieb et al.
(Continued)

FOREIGN PATENT DOCUMENTS

DE 10002379 A1 * 8/2001 ............. B60R 19/34
FR 2942605 A1 * 9/2010 ............. B60R 19/34
(Continued)

OTHER PUBLICATIONS

English translation of JP WO2012101810A1 (Year: 2014).*
International Search Report and Written Opinion mailed on Mar. 15, 2022, in corresponding PCT/JP2022/006535, 15 pages.

*Primary Examiner* — Lori Lyjak
(74) *Attorney, Agent, or Firm* — XSENSUS LLP

(57) ABSTRACT

A first shock absorption member between a frame forming a framework of a vehicle and an outer structure positioned outside of the frame in the vehicle, the first shock absorption member being installed in a manner that the outer structure is deformed preferentially over the frame in a shock-receiving situation in which the outer structure is displaced or deformed toward the frame side due to a shock load against the outer structure, a second shock absorption member between the frame and the outer structure, and a switching unit to switch an installation state of the second shock absorption member between a first installation state in which the second shock absorption member avoids the shock load in the shock-receiving situation and a second installation state in which the second shock absorption member receives the shock load and deforms together with the first shock absorption member in the shock-receiving situation are provided.

19 Claims, 32 Drawing Sheets

(56)     References Cited

U.S. PATENT DOCUMENTS

| | | |
|---|---|---|
| 2012/0187616 A1 | 7/2012 | Friedrich et al. |
| 2013/0300139 A1 | 11/2013 | Fukawatase |

FOREIGN PATENT DOCUMENTS

| | | |
|---|---|---|
| JP | 2013-505169 A | 2/2013 |
| WO | 2012/101810 A1 | 8/2012 |
| WO | 2013/164931 A1 | 11/2013 |

* cited by examiner

SHOCK ABSORPTION DEVICE

CROSS-REFERENCE TO RELATED APPLICATIONS

The present application is based on PCT filing PCT/JP2022/006535, filed Feb. 18, 2022, which claims priority from Japanese Patent Applications No. 2021-027042, filed on Feb. 24, 2021, the entire contents of each are incorporated herein by reference.

TECHNICAL FIELD

The present invention relates to a shock absorption device.

BACKGROUND ART

Typically, in a bumper of an automobile, a crash can (also referred to as a crash box) that is plastically deformable is provided as a shock absorption device between a frame (also referred to as a chassis) forming a framework of a vehicle and a bumper beam. In collision of the vehicle, the crash can undergo buckling deformation in a front-rear direction of the vehicle due to a shock load and is crushed, and thus, the crash can absorbs energy due to the collision of the vehicle, which suppresses deformation of the frame.

In this regard, Patent Document 1 discloses an adaptive degradation device of collision energy. The adaptive degradation device of the collision energy disclosed in Patent Document 1 is configured to degrade the collision energy by deforming deformation member in a tapered shape due to the collision energy. In the adaptive degradation device of the collision energy, the number of plates constituting a tapered surface for deforming the deformation member is changed by using an actuator device to adjust the tapered shape of the deformation member, thereby making a degradation amount of the collision energy variable.

CITATION LIST

Patent Document

Patent Document 1: JP 2013-505169 T

SUMMARY OF INVENTION

Technical Problem

Here, in order to more reliably protect an occupant even when collision energy is relatively large, for example, when a vehicle collides at a high speed, it is necessary to be able to absorb large collision energy. For this reason, the strength of a shock absorption device is preferably high. In this case, a frame deforms together with the shock absorption device to absorb shock. On the other hand, in light collision in which collision energy is relatively small, for example, when a vehicle collides at a low speed, when the strength of the shock absorption device is high, a large shock load is required to deform the shock absorption device. As a result, it is considerable that the shock absorption device cannot be sufficiently deformed and thus, cannot sufficiently absorb the collision energy. This may result in deformation of the frame or transmission of the shock to the occupant. When the frame is affected even in the light collision, the influence cannot be coped with by replacing only a bumper beam and the shock absorption device, which is inconvenient from the viewpoint of repairability. Additionally, in this case, there is also a disadvantage that the value of the vehicle is reduced because of an accident history. Thus, in the case where the collision energy is relatively small, it is preferable that the shock absorption device be adjustable to reduce the strength, and thus, the shock absorption device is deformed even with the small collision energy.

The technique according to the present disclosure has been made in view of the above problems, and an object of the present disclosure is to provide a technique that the strength can be changed in a shock absorption device for absorbing the collision energy of the vehicle.

Solution to Problem

To solve the above problem, the technique of the present disclosure adopts the following configuration. That is, according to the technique of the present disclosure, there is provided a shock absorption device including a first shock absorption member provided between a frame forming a framework of a vehicle and an outer structure positioned outside of the frame in the vehicle, the first shock absorption member being installed in a manner that the outer structure is deformed preferentially over the frame in a shock-receiving situation in which the outer structure is displaced or deformed toward a frame side due to a shock load against the outer structure, a second shock absorption member provided between the frame and the outer structure, and a switching unit configured to switch an installation state of the second shock absorption member between a first installation state in which the second shock absorption member avoids the shock load in the shock-receiving situation and a second installation state in which the second shock absorption member receives the shock load and deforms together with the first shock absorption member in the shock-receiving situation.

The shock absorption device according to the present disclosure can switch the installation state of the second shock absorption member between the first installation state in which the second shock absorption member avoids the shock load and the second installation state in which the second shock absorption member receives the shock load. Thus, the shock absorption device can switch strength against the shock load. According to this configuration, in collision in which collision energy is relatively large, the second shock absorption member is brought into the second installation state and is deformed together with the first shock absorption member, whereby the large collision energy can be absorbed. On the other hand, in light collision in which collision energy is relatively small, the second shock absorption member is brought into the first installation state, and only the first shock absorption member is deformed, whereby the collision energy is absorbed. That is, while the shock in the heavy collision is absorbed, the shock is absorbed only by the first shock absorption member in the light collision, and the transmission of the shock to the frame is suppressed, which can improve the repairability of the vehicle.

The shock absorption device of the present disclosure may further include a base portion provided at the frame, the base portion being configured to fix the first shock absorption member, a reception portion opening at the base portion, the reception portion being configured to receive the second shock absorption member in the first installation state in the shock-receiving situation, the reception portion being configured to allow movement of the second shock absorption member toward the frame side and thus to cause the second shock absorption member to avoid the shock load, and a contact portion provided at the base portion, the contact portion being configured to come into contact with the second shock absorption member in the second installation state in the shock-receiving situation, the contact portion being configured to restrict movement of the second shock absorption member toward the frame side and thus to cause the second shock absorption member to receive the shock load.

In addition, in the above-described shock absorption device, the contact portion may be formed as a part of the base portion in a manner that the contact portion surrounds the reception portion, and the switching unit may displace the second shock absorption member with respect to the reception portion, and thus switch the second shock absorption member between the first installation state and the second installation state.

In addition, in the above-described shock absorption device, the switching unit may displace the contact portion with respect to the reception portion, and switch the second shock absorption member between the first installation state by disposing the contact portion at a first position where the second shock absorption member is caused to enter the reception portion and the second installation state by disposing the contact portion at a second position where the second shock absorption member is prevented from entering the reception portion.

In addition, in the shock absorption device according to the present disclosure, an outer shape of a cross section which is a cross section of the second shock absorption member and orthogonal to a direction from an outer structure side toward the frame side may be smaller than a size of a cross section of the reception portion at an end portion on the frame side, gradually increase in size toward the outer structure side, and be larger than the size of the cross section of the reception portion at the end portion on the outer structure side.

In addition, in the shock absorption device according to the present disclosure, the base portion may be formed with a fragile portion, the fragile portion being configured to come into contact with the second shock absorption member in the first installation state in the shock-receiving situation, to fracture by receiving a load from the second shock absorption member, and thus to open the reception portion.

In addition, in the shock absorption device according to the present disclosure, an end portion of the second shock absorption member at a side facing the base portion may include a contact region configured to come into contact with the fragile portion and a non-contact region configured not to come into contact with the base portion when the second shock absorption member is at least in the first installation state in the shock-receiving situation.

In addition, in the shock absorption device according to the present disclosure, each of the first shock absorption member and the second shock absorption member is formed in a tubular shape extending from the frame side to the outer structure side, and the second shock absorption member may be installed inside the first shock absorption member.

In addition, in the shock absorption device according to the present disclosure, a projecting portion protruding toward the first shock absorption member may be formed at an outer peripheral surface of the second shock absorption member, and the second shock absorption member may be held by the first shock absorption member by engaging the projecting portion with an inner peripheral surface of the first shock absorption member.

Further, in the above-described shock absorption device, when the second shock absorption member is in the second installation state in the shock-receiving situation, the projecting portion may guide the first shock absorption member in a manner that the first shock absorption member buckles along the second shock absorption member.

In addition, in the shock absorption device according to the present disclosure, when the second shock absorption member is in the second installation state in the shock-receiving situation, the first shock absorption member and the second shock absorption member may be installed in a manner that a timing at which deformation of the first shock absorption member starts is different from a timing at which deformation of the second shock absorption member starts.

In addition, in the above-described shock absorption device, an end portion of the first shock absorption member on the outer structure side may be positioned closer to the outer structure side than an end portion of the second shock absorption member on the outer structure side.

Further, in the shock absorption device according to the present disclosure, the second shock absorption member may extend in a manner that one end portion of the second shock absorption member is connected to the frame and the other end portion of the second shock absorption member is connected to the outer structure, the switching unit may be capable of disconnecting connection of one of a frame-side connection portion that is a connection portion between the second shock absorption member and the frame and an outer connection portion that is a connection portion between the second shock absorption member and the outer structure, and when the second shock absorption member is in the first installation state in the shock-receiving situation, the second shock absorption member may avoid the shock load by disconnecting the connection of the one of the frame-side connection portion and the outer connection portion by the switching unit, and when the second shock absorption member is in the second installation state in the shock-receiving situation, the second shock absorption member may receive the shock load by maintaining connections of both the frame-side connection portion and the outer connection portion.

Advantageous Effects of Invention

According to the present disclosure, in a shock absorption device for absorbing collision energy of a vehicle, the strength thereof can be changed.

5 when the second shock absorption member is in a second installation state in the non-collision situation in the first embodiment.

Figure 7:
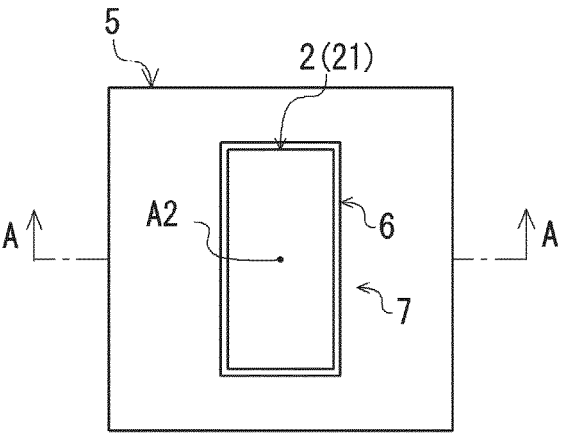

FIG. 7 is a front view illustrating a relationship between the second shock absorption member and the base portion when the second shock absorption member is in the first installation state in the non-collision situation in the first embodiment.

Figure 8:
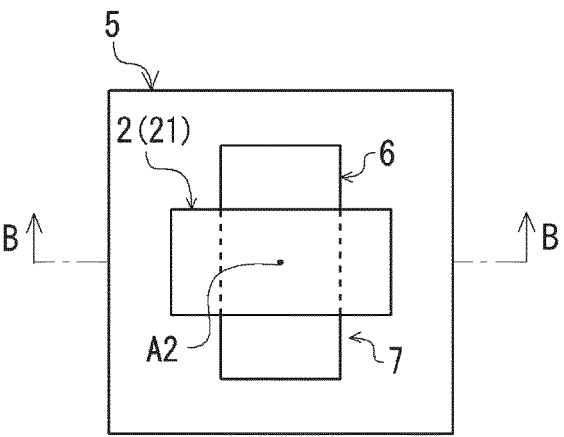

FIG. 8 is a front view illustrating a relationship between the second shock absorption member and the base portion when the second shock absorption member is in the second installation state in the non-collision situation in the first embodiment.

Figure 9:
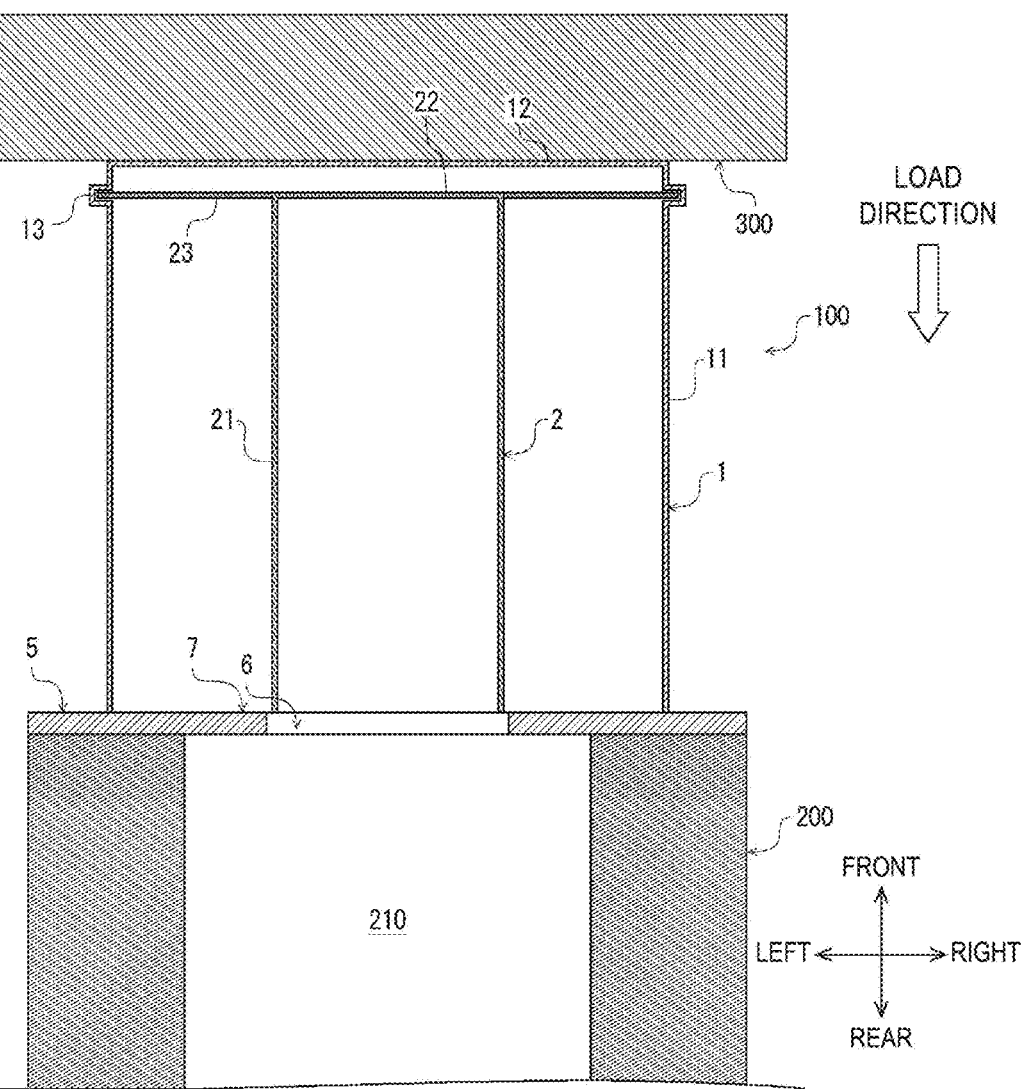

FIG. 9 is a cross-sectional view illustrating a state of the shock absorption device when the second shock absorption member is in the first installation state in the non-collision situation in the first embodiment.

Figure 10:
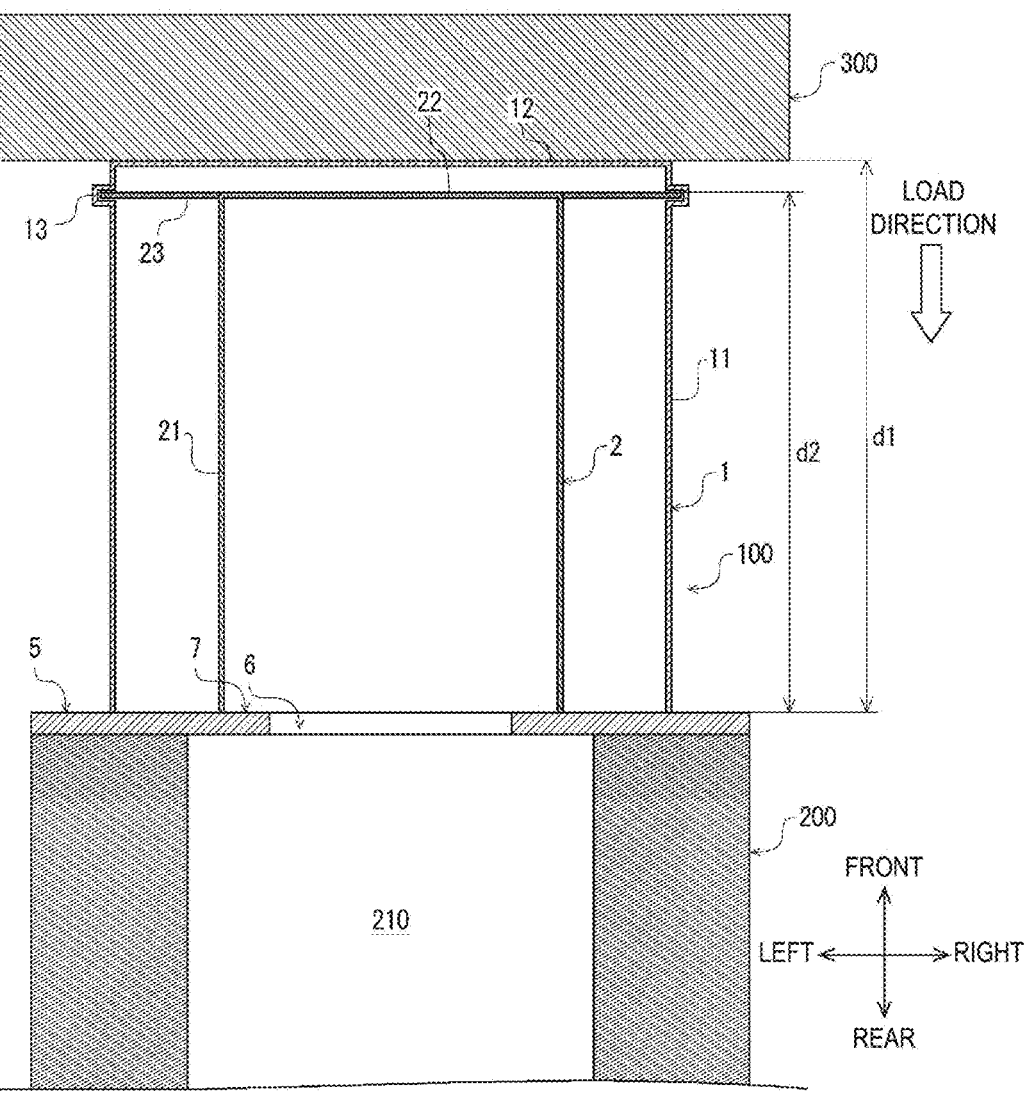

FIG. 10 is a cross-sectional view illustrating a state of the shock absorption device when the second shock absorption member is in the second installation state in the non-collision situation in the first embodiment.

Figure 11:
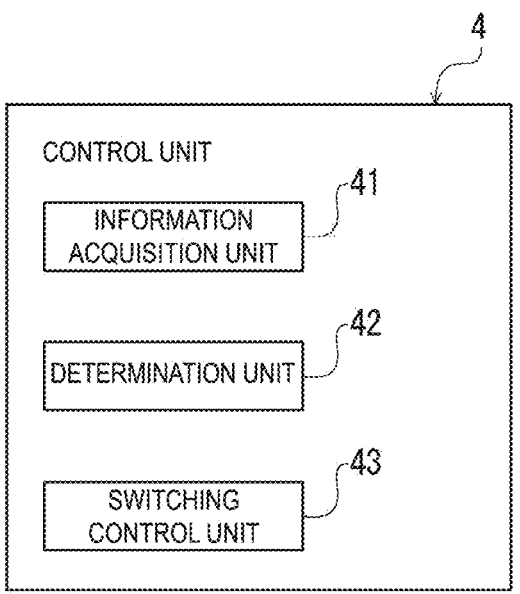

FIG. 11 is a functional block diagram of a control unit according to the first embodiment.

Figure 12:
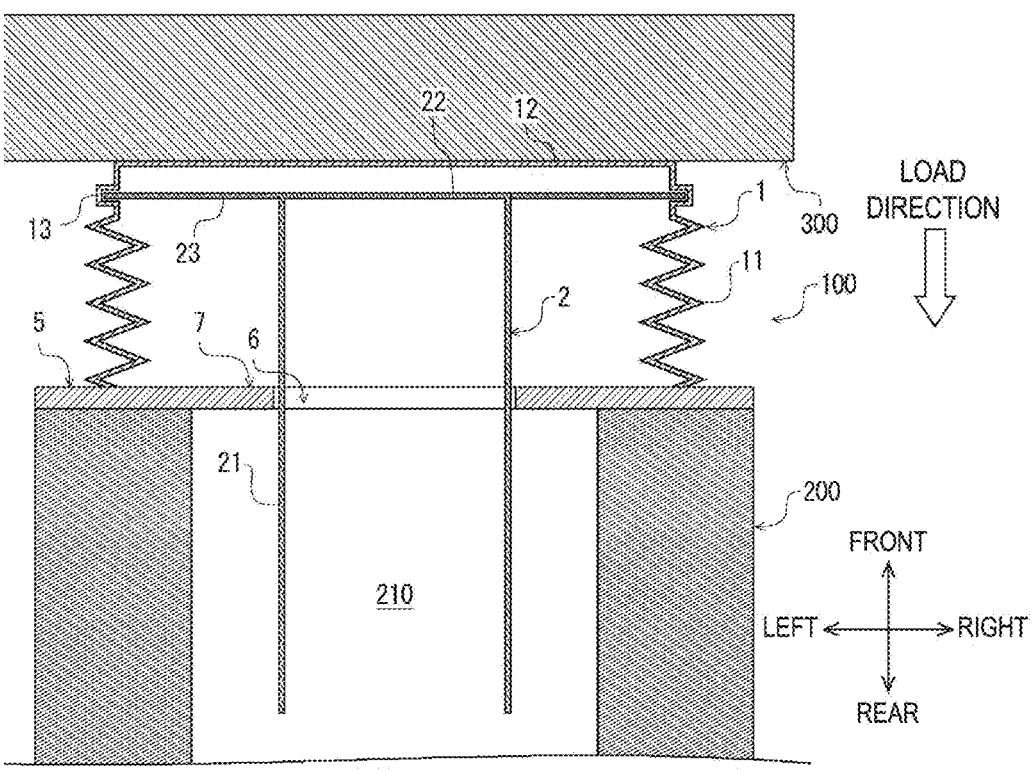

FIG. 12 is a cross-sectional view illustrating a state of the shock absorption device when the second shock absorption member is in the first installation state in a shock-receiving situation in the first embodiment.

Figure 13:
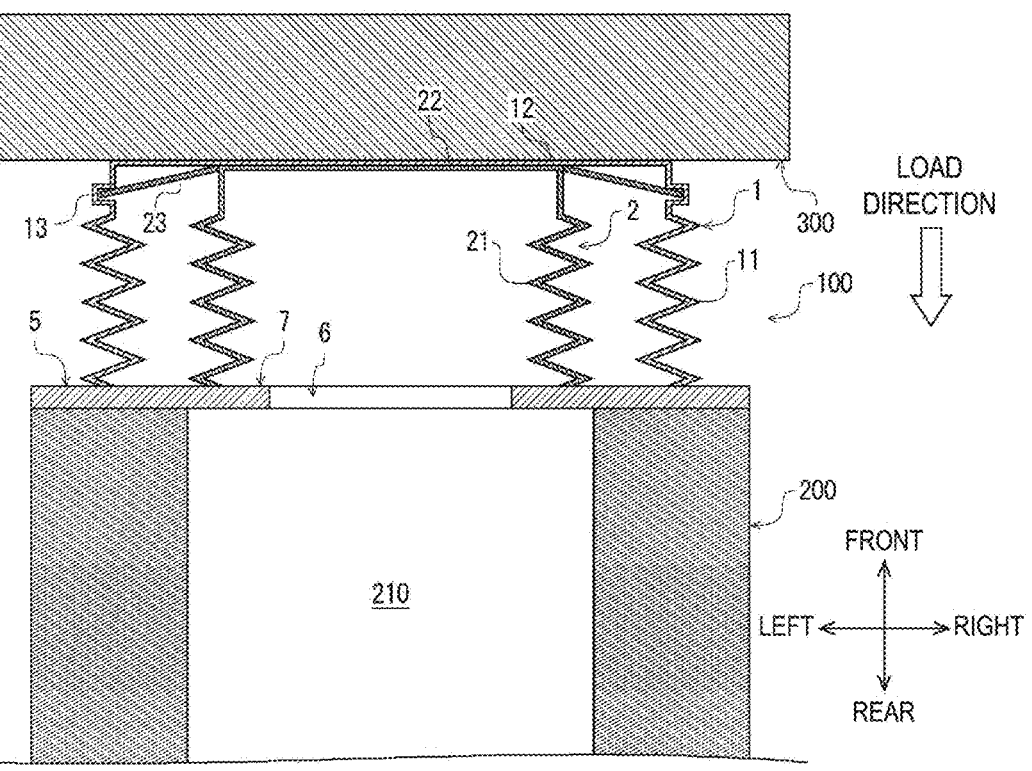

FIG. 13 is a cross-sectional view illustrating a state of the shock absorption device when the second shock absorption member is in the second installation state in the shock-receiving situation in the first embodiment.

Figure 14:
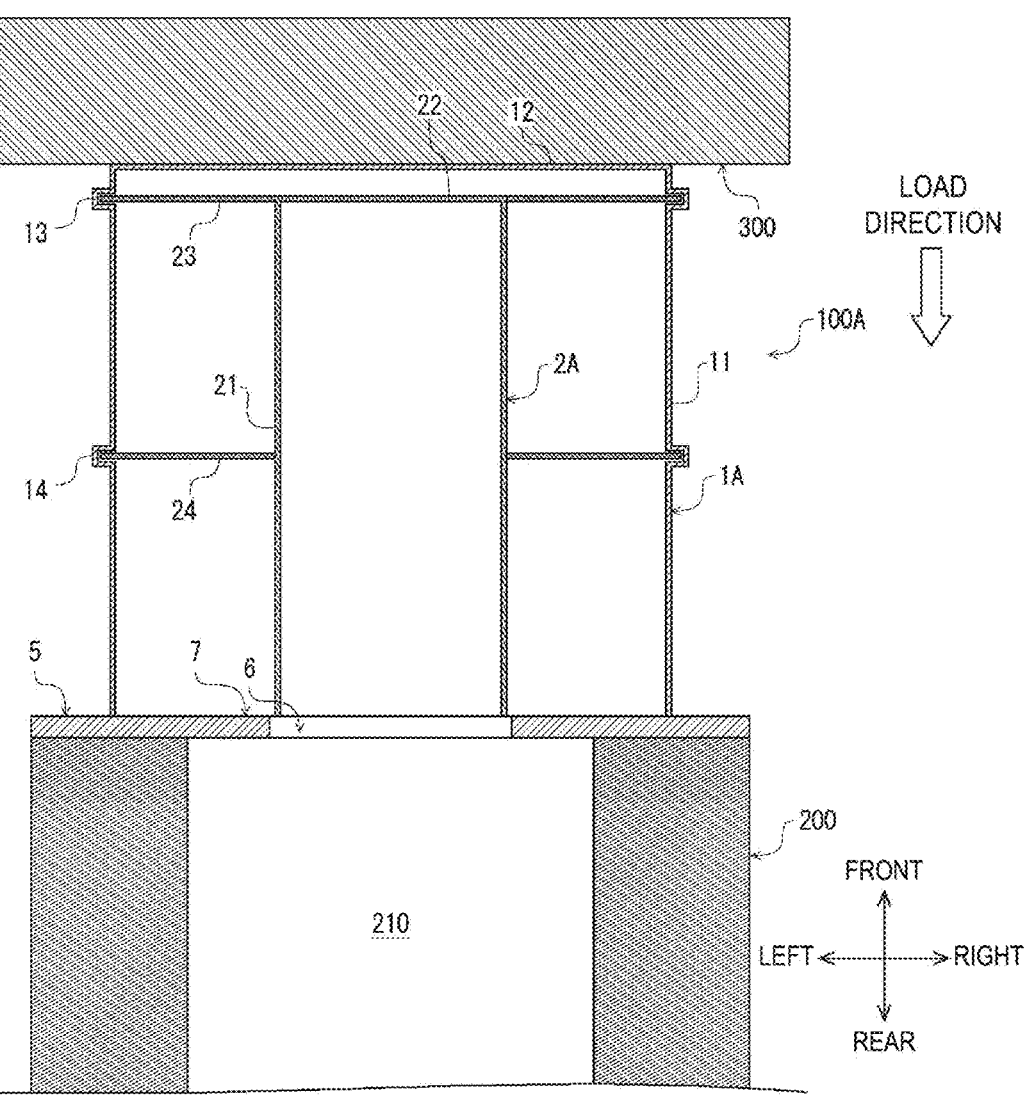

FIG. 14 is a cross-sectional view illustrating a state of the shock absorption device when the second shock absorption member is in the first installation state in the non-collision situation in a first modified example of the first embodiment.

Figure 15:
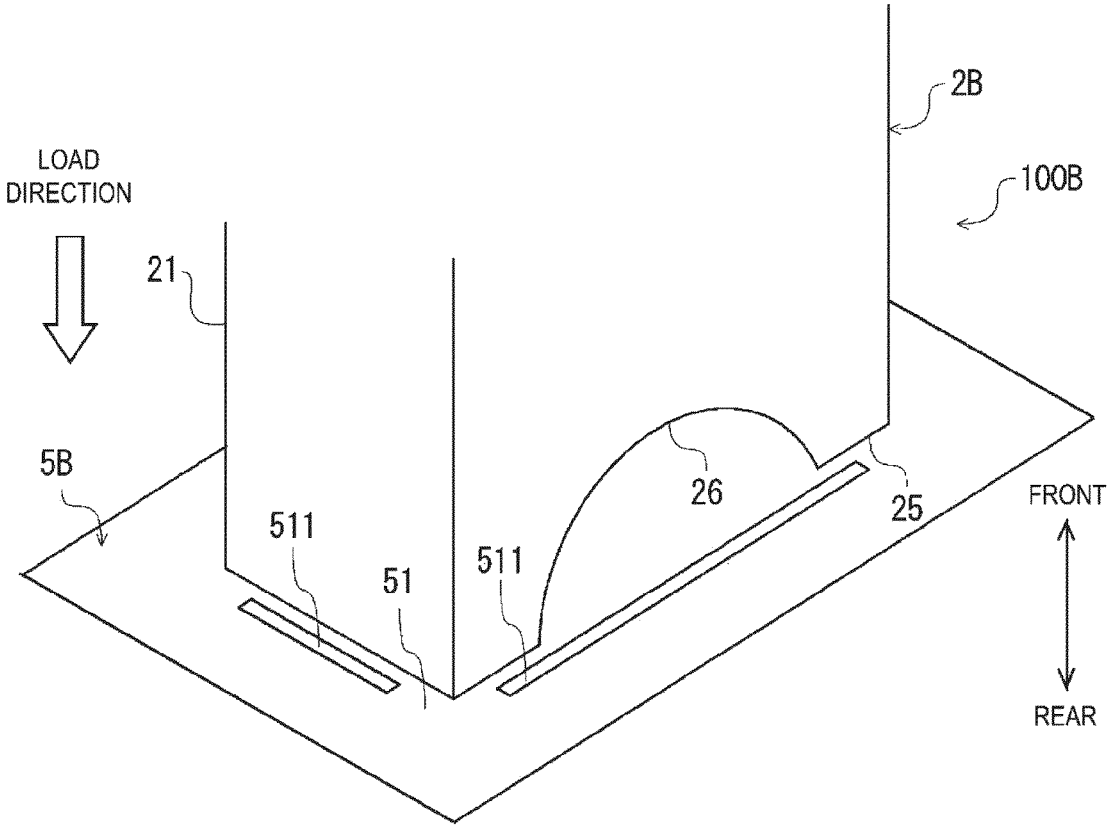

FIG. 15 is a perspective view illustrating a state of the shock absorption device when the second shock absorption member is in the first installation state in the non-collision situation in a second modified example of the first embodiment.

Figure 16:
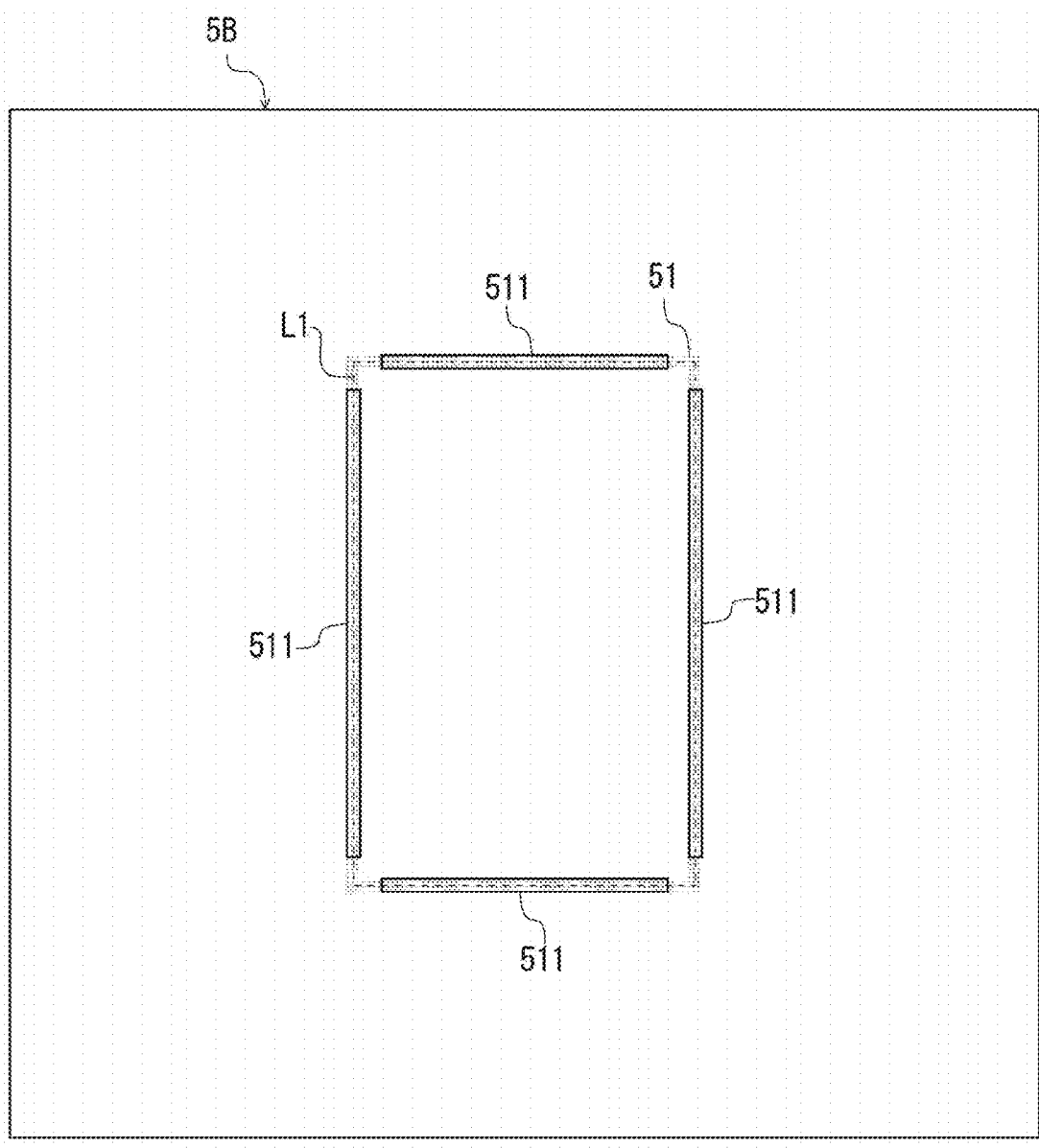

FIG. 16 is a front view of a base portion according to the second modified example of the first embodiment.

Figure 17:
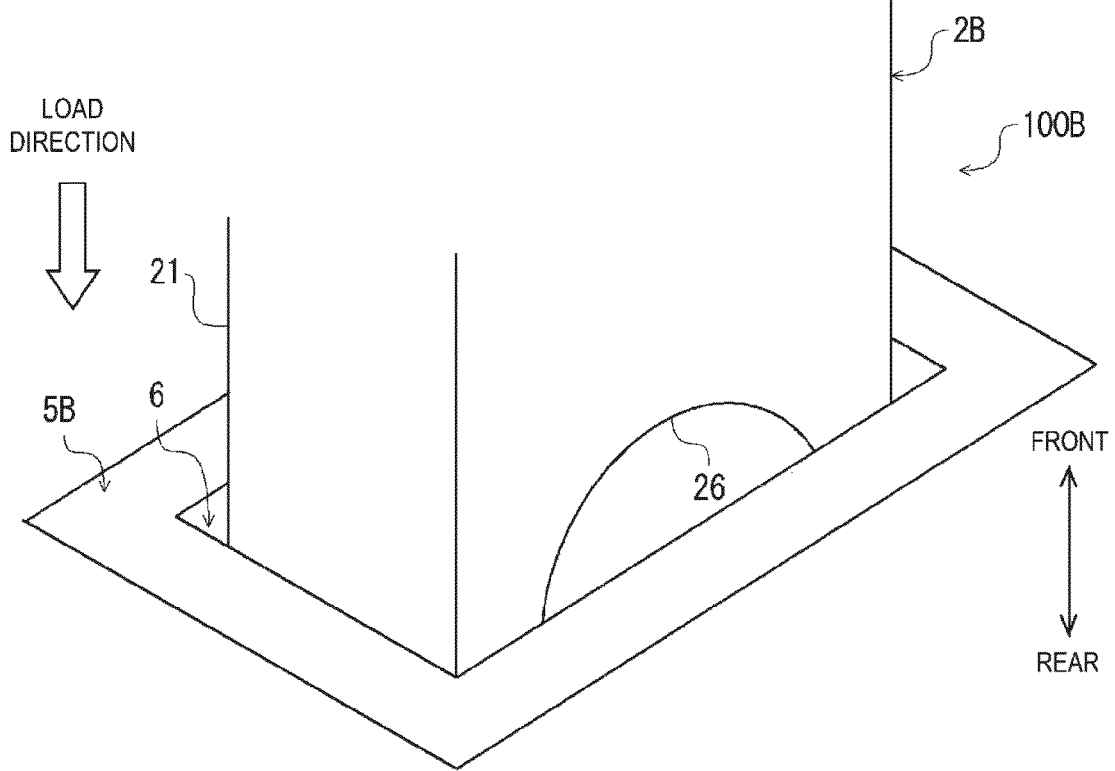

FIG. 17 is a perspective view illustrating a state of the shock absorption device when the second shock absorption member is in the first installation state in a collided situation in the second modified example of the first embodiment.

Figure 18:
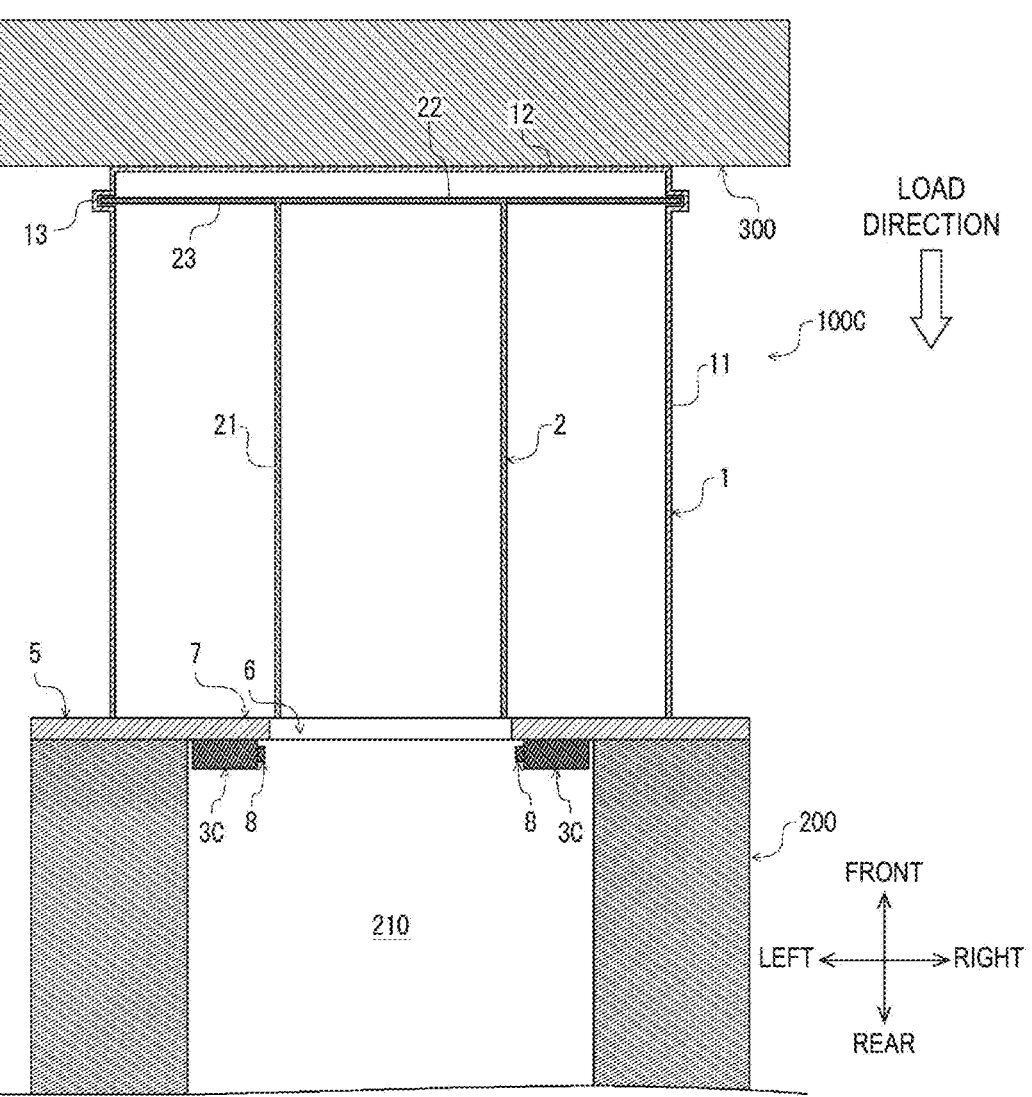

FIG. 18 is a cross-sectional view illustrating a state of the shock absorption device when the second shock absorption member is in the first installation state in a non-collision situation in a second embodiment.

Figure 19:
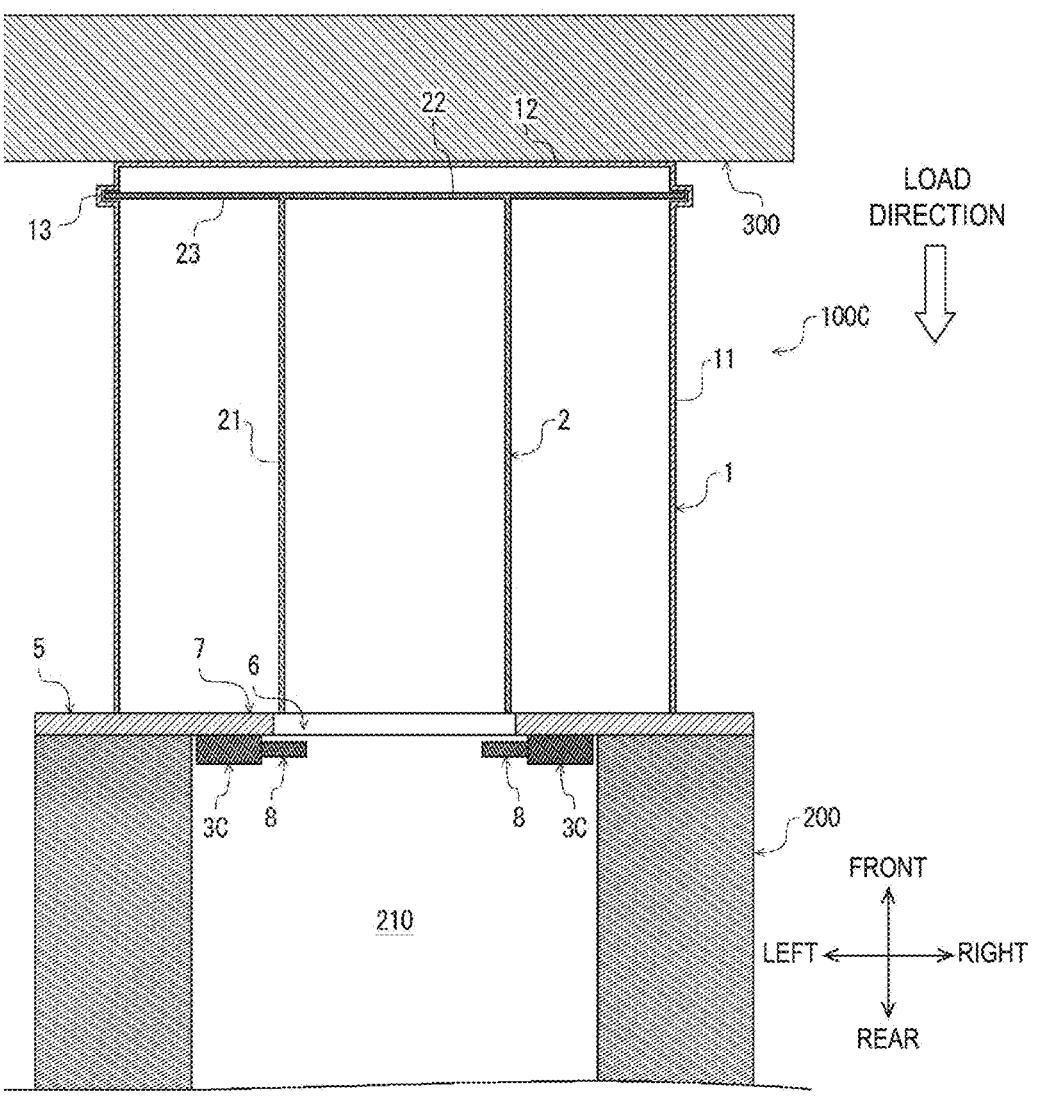

FIG. 19 is a cross-sectional view illustrating a state of the shock absorption device when the second shock absorption member is in the second installation state in the non-collision situation in the second embodiment.

Figure 20:
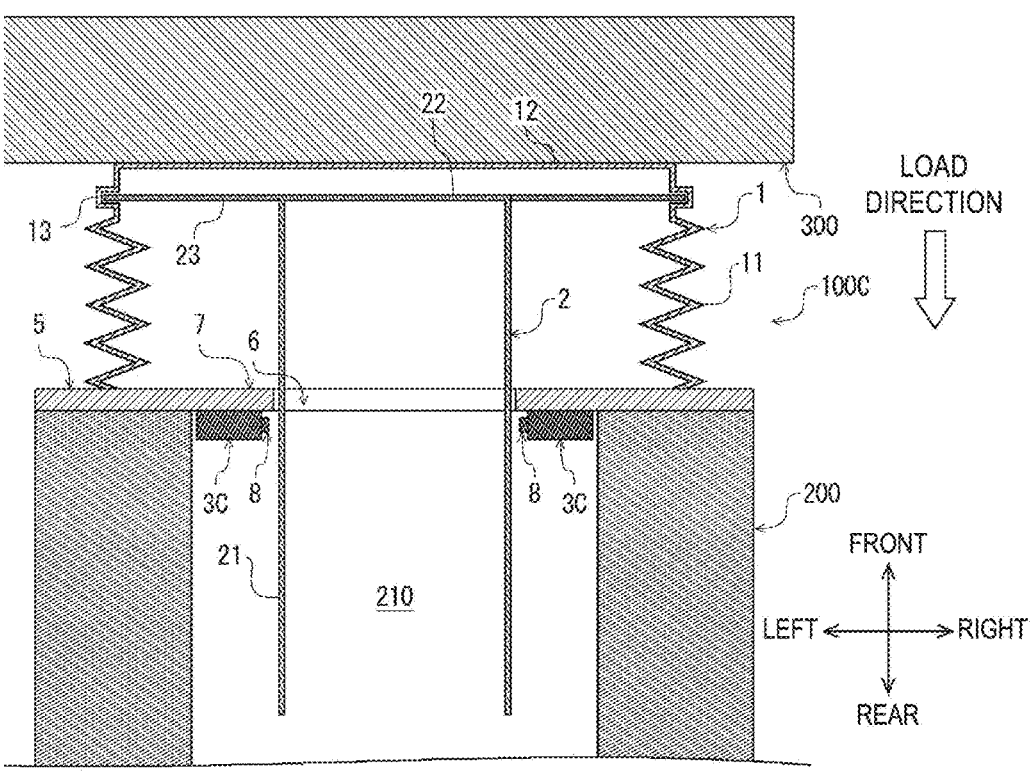

FIG. 20 is a cross-sectional view illustrating a state of the shock absorption device when the second shock absorption member is in the first installation state in a shock-receiving situation in the second embodiment.

Figure 21:
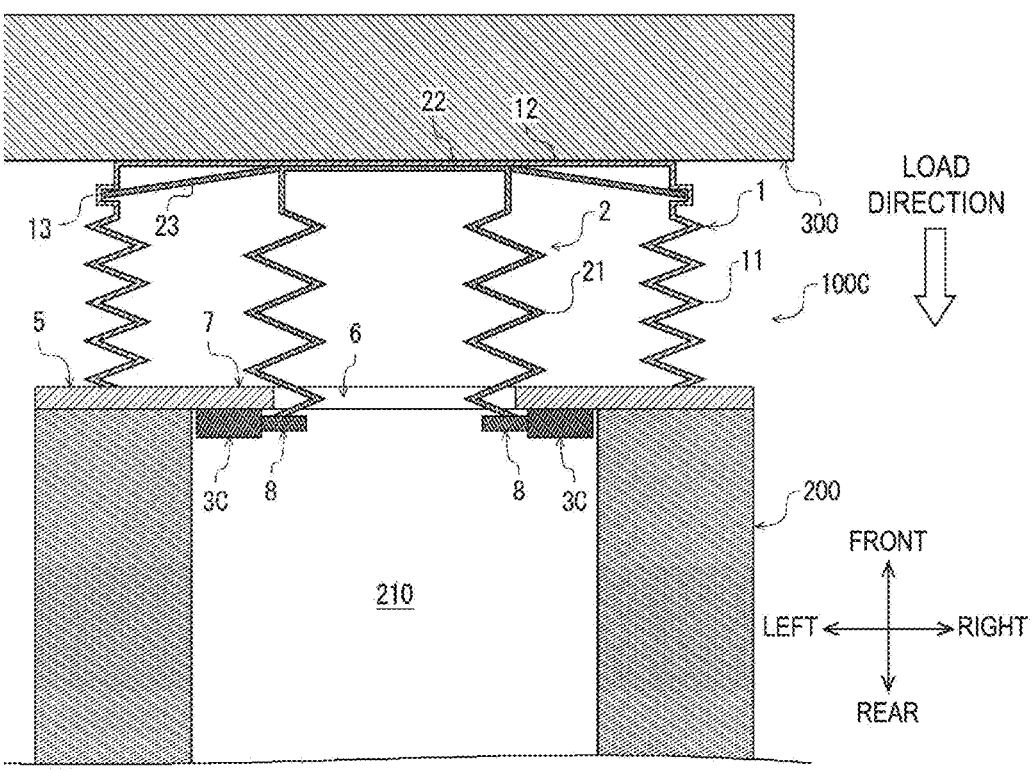

FIG. 21 is a cross-sectional view illustrating a state of the shock absorption device when the second shock absorption member is in the second installation state in the shock-receiving situation in the second embodiment.

Figure 22:
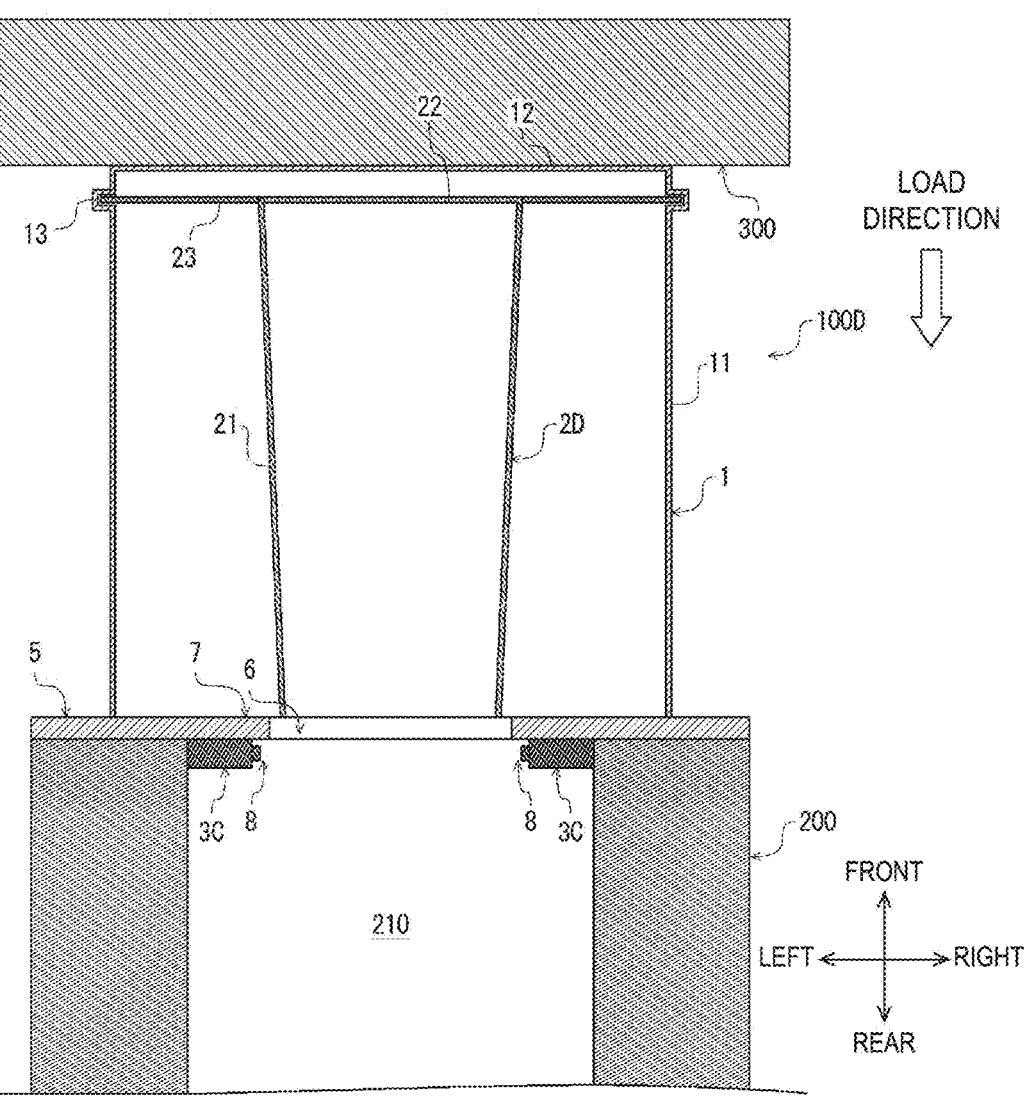

FIG. 22 is a cross-sectional view illustrating a state of the shock absorption device when the second shock absorption member is in the first installation state in a non-collision situation in a first modified example of the second embodiment.

6

Figure 23:
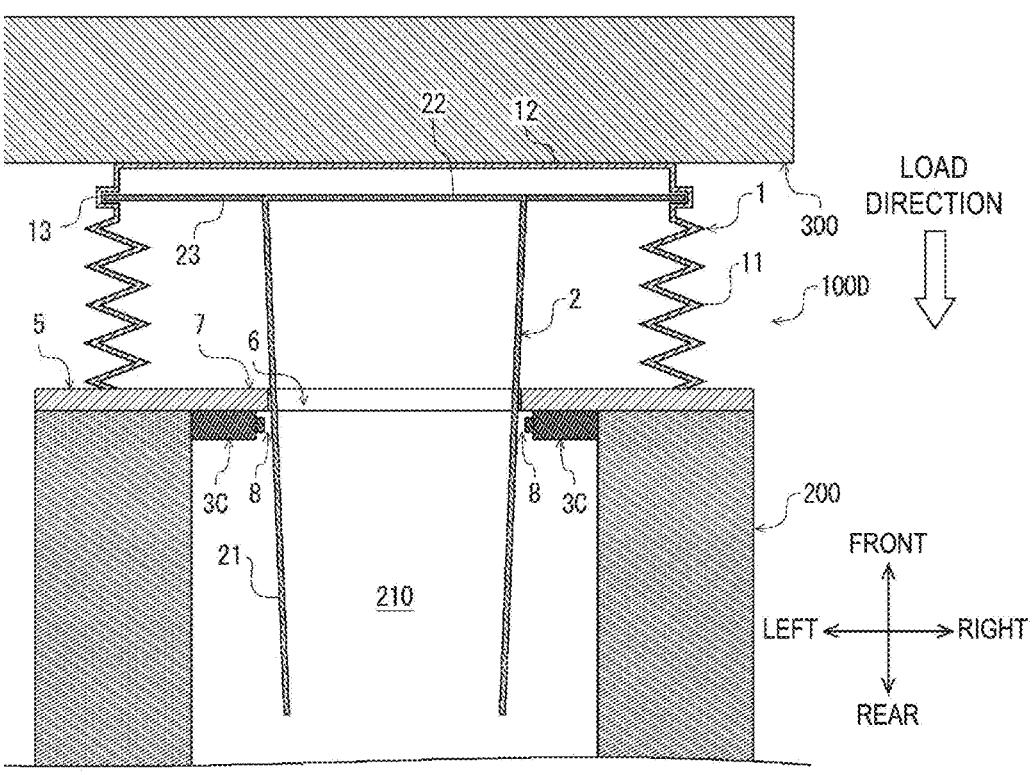

FIG. 23 is a cross-sectional view illustrating a state of the shock absorption device when the second shock absorption member is in the first installation state in a collided situation in the first modified example of the second embodiment.

Figure 24:
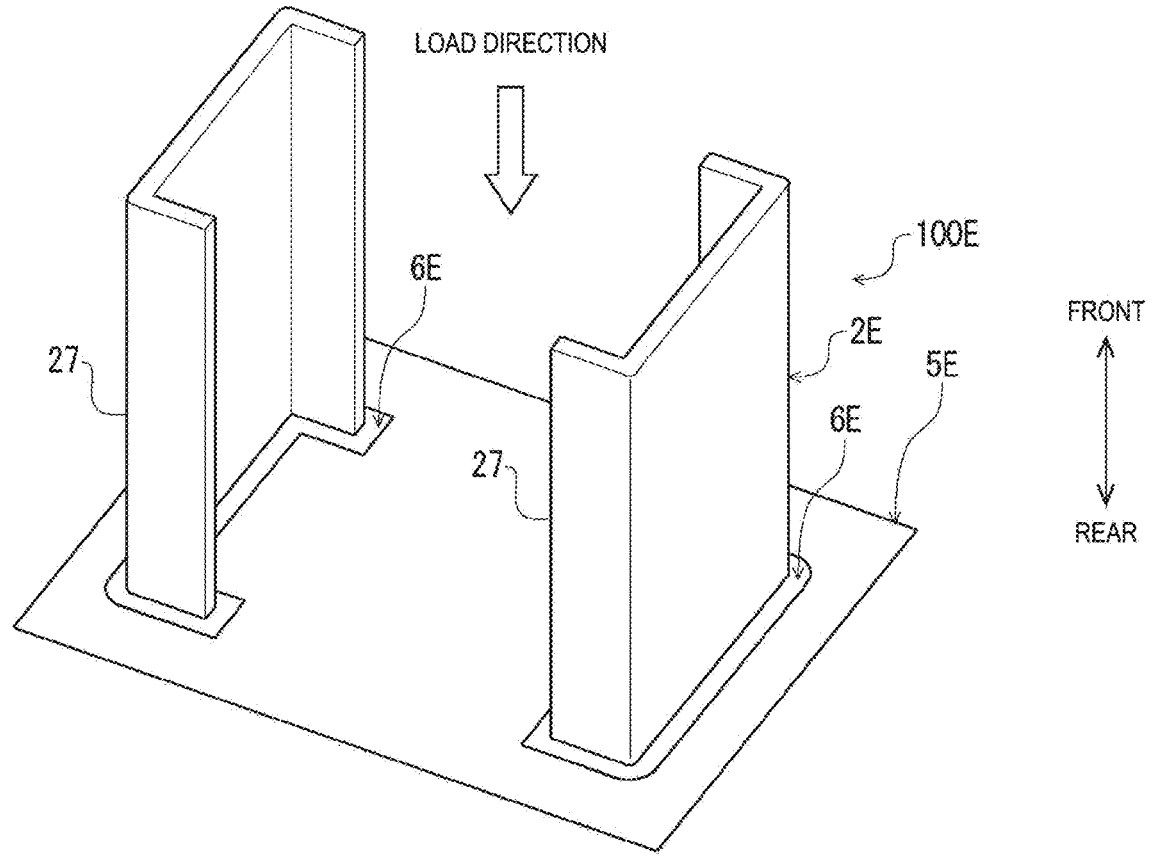

FIG. 24 is a perspective view illustrating a state of the shock absorption device when the second shock absorption member is in the first installation state in a non-collision situation in a second modified example of the second embodiment.

Figure 25:
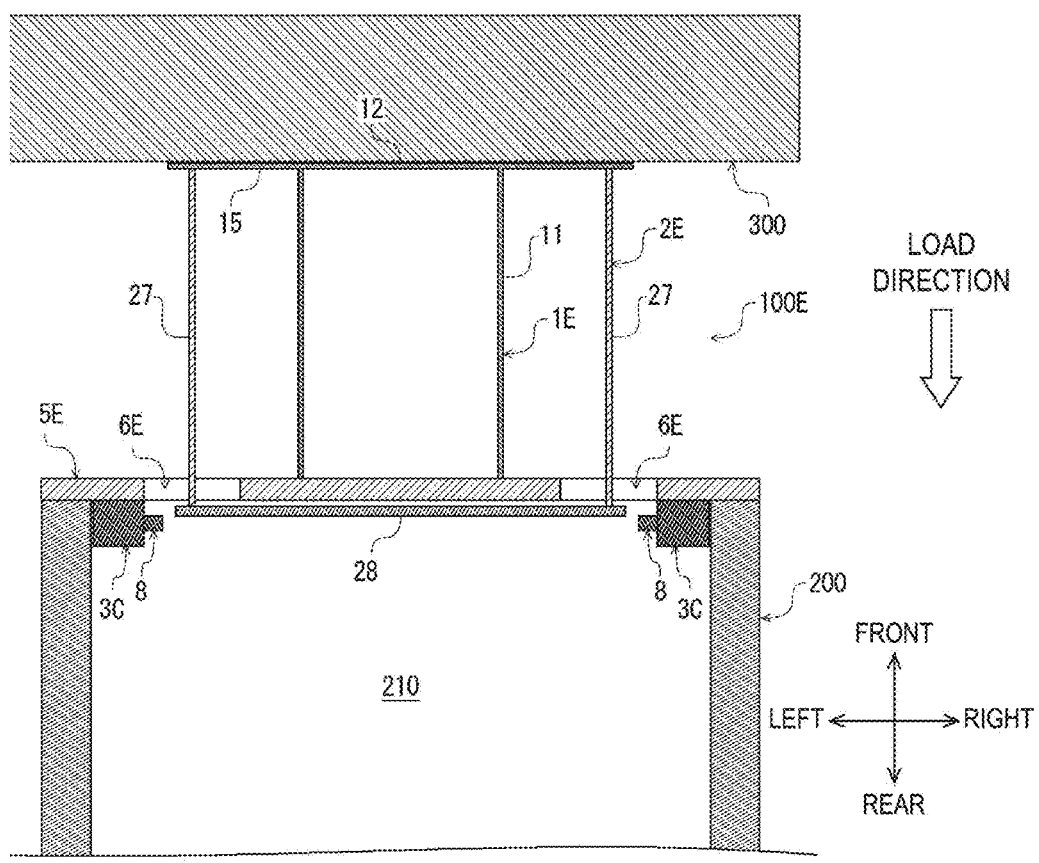

FIG. 25 is a cross-sectional view illustrating a state of the shock absorption device when the second shock absorption member is in the first installation state in the non-collision situation in the second modified example of the second embodiment.

Figure 26:
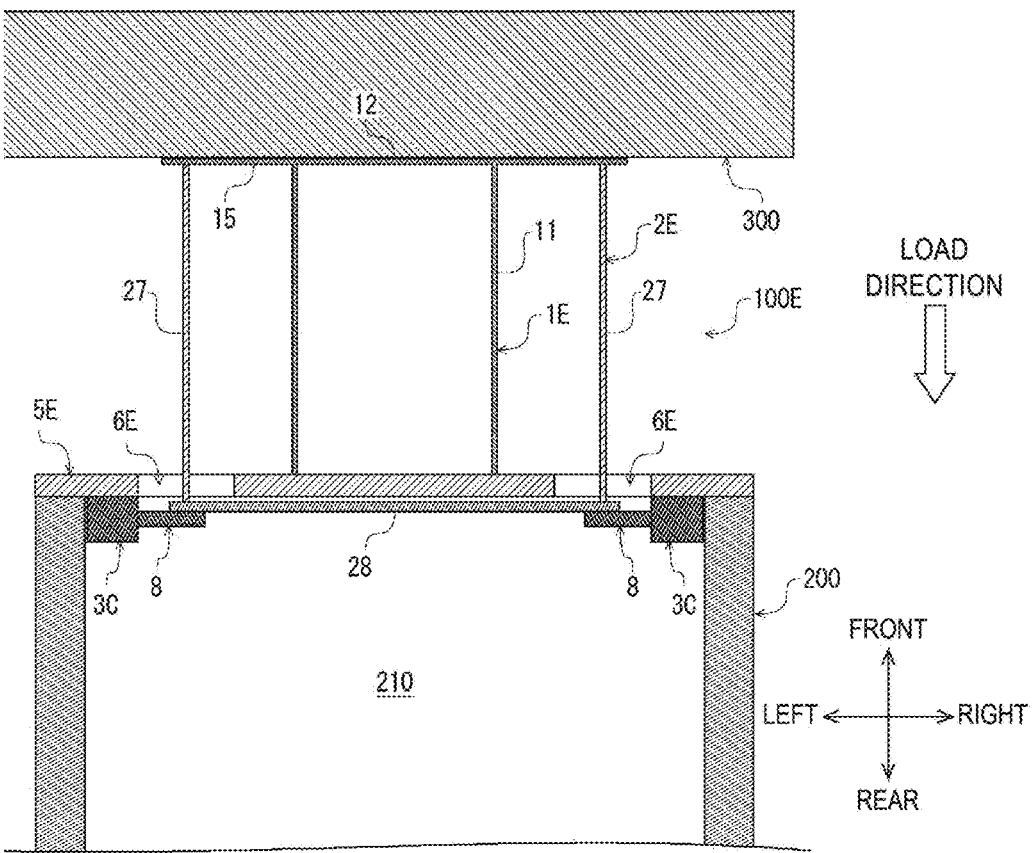

FIG. 26 is a cross-sectional view illustrating a state of the shock absorption device when the second shock absorption member is in the second installation state in the non-collision situation in the second modified example of the second embodiment.

Figure 27:
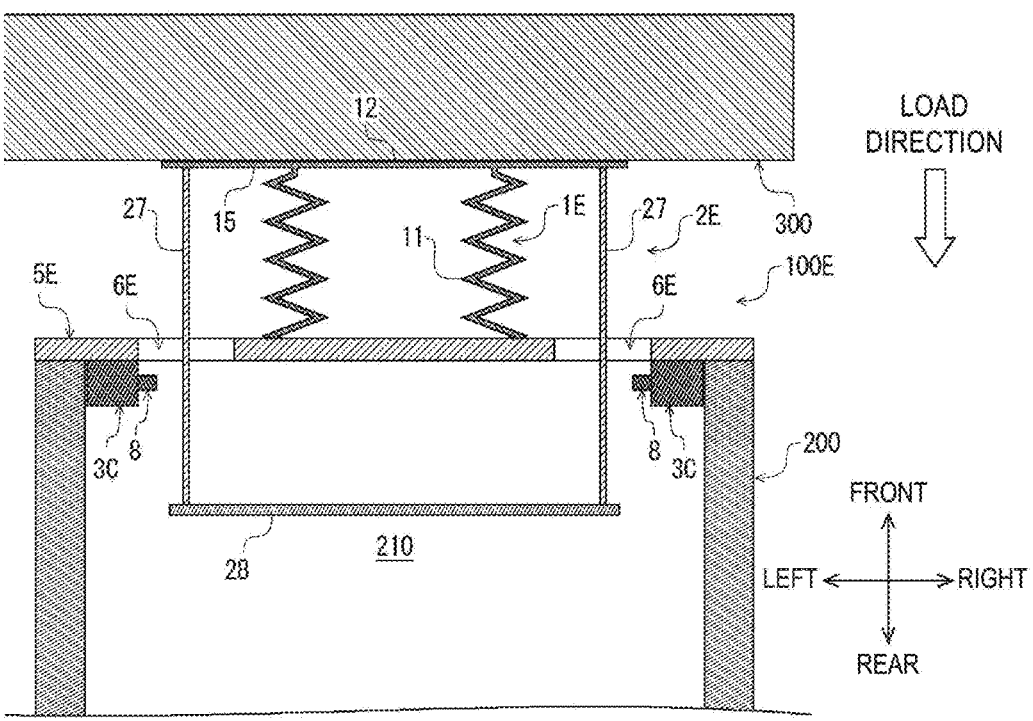

FIG. 27 is a cross-sectional view illustrating a state of the shock absorption device when the second shock absorption member is in the first installation state in a collided situation in the second modified example of the second embodiment.

Figure 28:
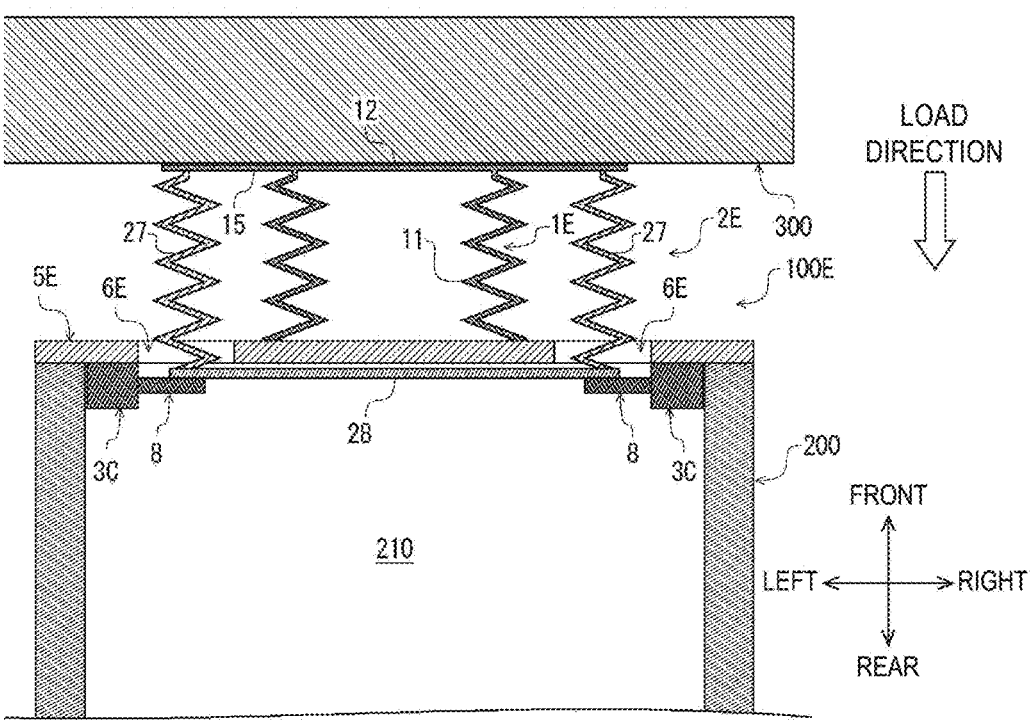

FIG. 28 is a cross-sectional view illustrating a state of the shock absorption device when the second shock absorption member is in the second installation state in the collided situation in the second modified example of the second embodiment.

Figure 29:
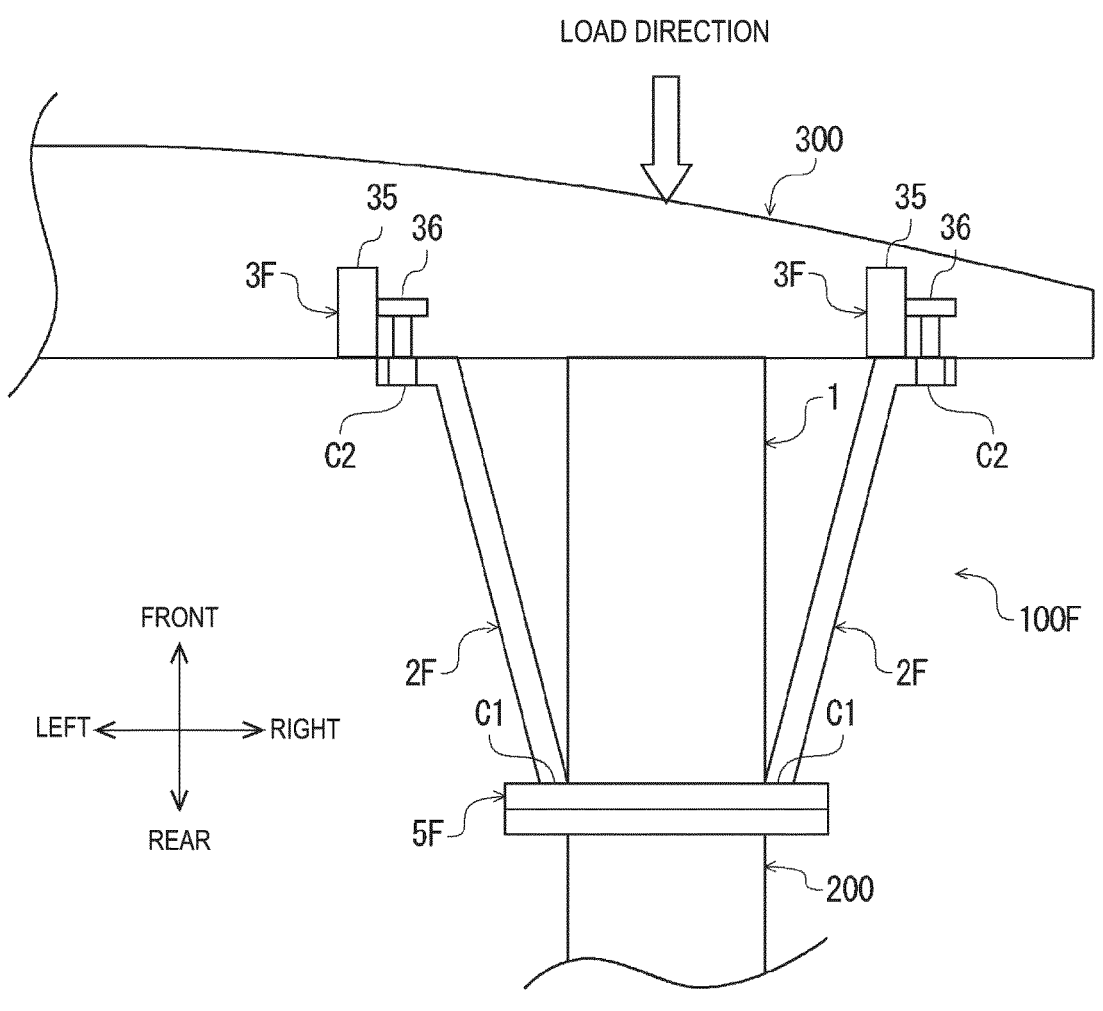

FIG. 29 is a top view illustrating a state of the shock absorption device when the second shock absorption member is in the first installation state in a non-collision situation in a third embodiment.

Figure 30:
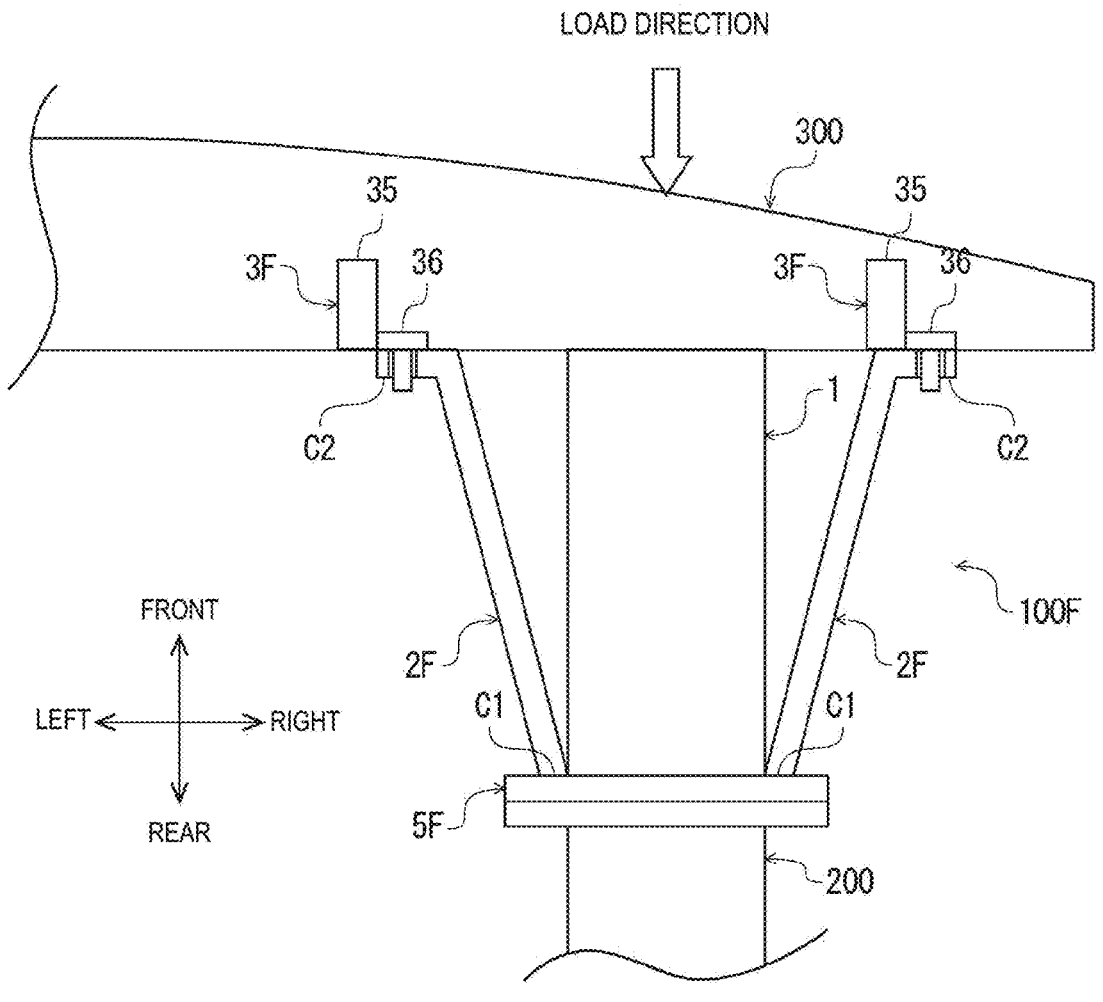

FIG. 30 is a top view illustrating a state of the shock absorption device when the second shock absorption member is in the second installation state in the non-collision situation in the third embodiment.

Figure 31:
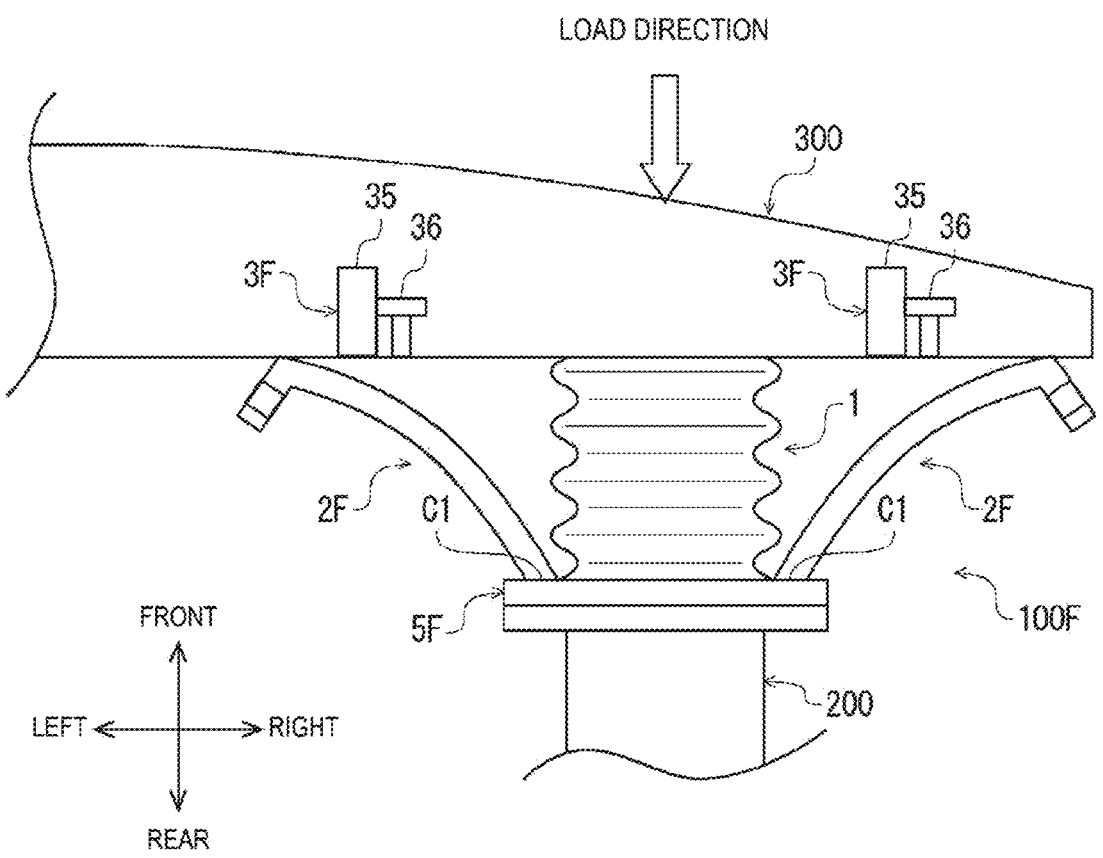

FIG. 31 is a top view illustrating a state of the shock absorption device when the second shock absorption member is in the first installation state in a collided situation in the third embodiment.

Figure 32:
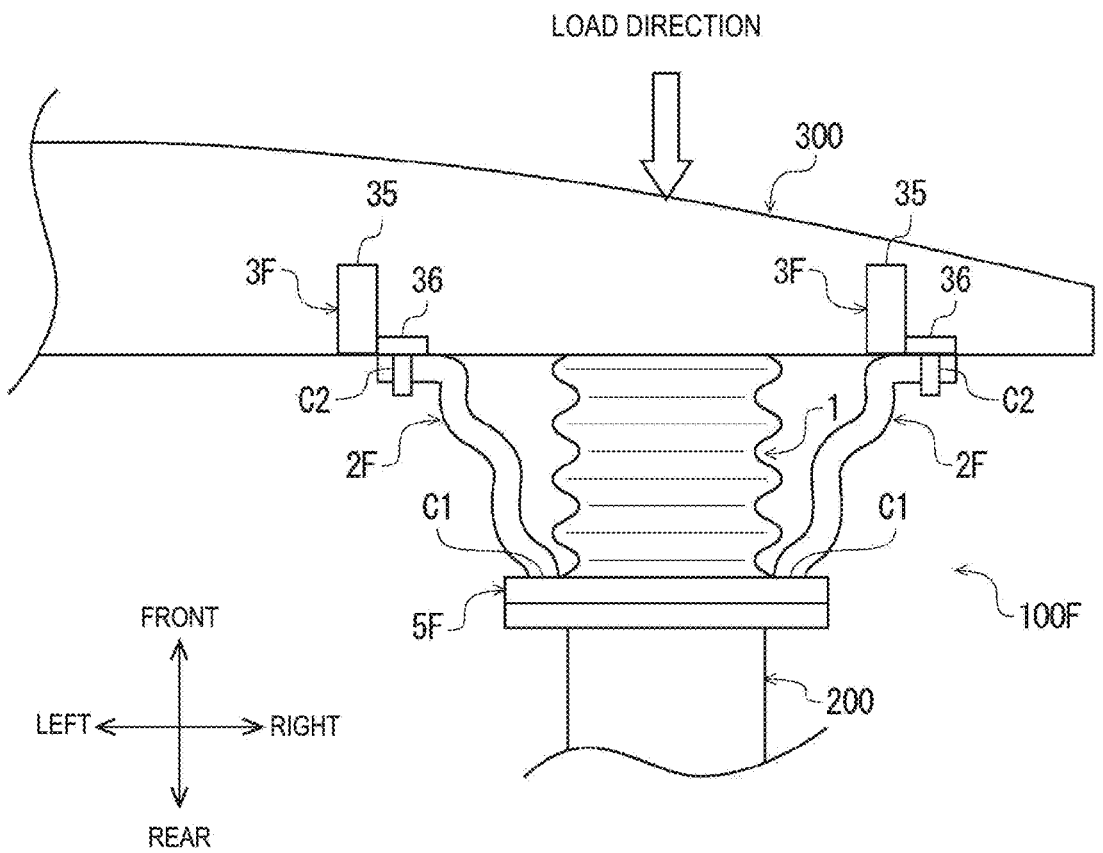

FIG. 32 is a top view illustrating a state of the shock absorption device when the second shock absorption member is in the second installation state in the collided situation in the third embodiment.

DESCRIPTION OF EMBODIMENTS

Embodiments according to the present disclosure will be described below with reference to the accompanying drawings. It should be noted that the respective configurations and the combinations thereof in the respective embodiments are mere examples, and the configurations can be added, omitted, substituted, and differently modified as appropriate within a scope not departing from the spirit of the present invention. The present disclosure is not limited by the embodiments, but only limited by the claims.

First Embodiment

Figure 1:
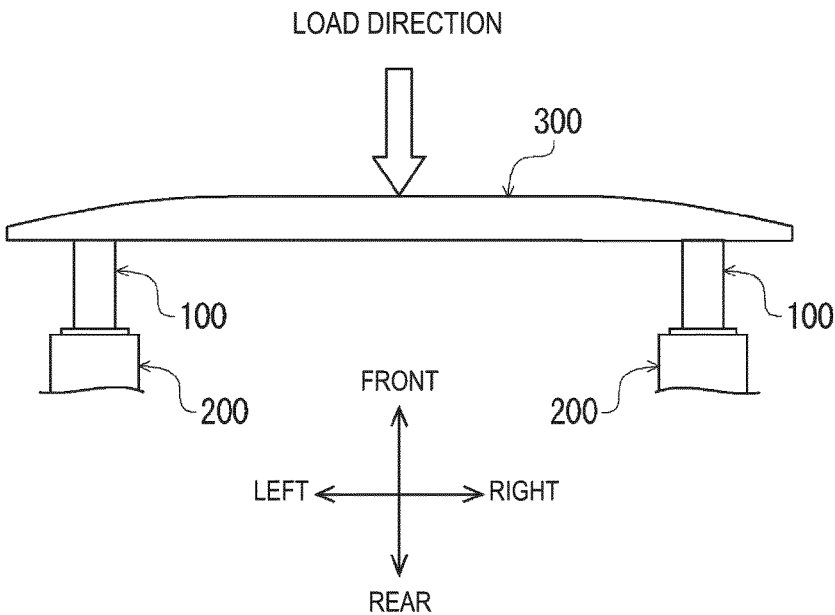
FIG. 1 is a top view illustrating a mounting state of a shock absorption device according to a first embodiment.

Hereinafter, as a first embodiment, an aspect in which a shock absorption device according to the present disclosure is applied to a front bumper of a vehicle will be described. FIG. 1 is a top view illustrating a mounting state of a shock absorption device 100 according to the first embodiment. FIG. 1 illustrates a state of the shock absorption device 100 in a situation before vehicle collision (hereinafter, referred to as a non-collision situation). Front, rear, left, and right orientations in the following description are assumed as front, rear, left, and right orientations of a vehicle unless particularly stated. The arrows in FIG. 1 represent the front, rear, left, and right orientations of the vehicle. The reference sign 200 in FIG. 1 denotes a frame that forms a framework of the vehicle, and denotes a side frame extending in a front-rear direction. The side frames 200 are arranged one by one on the left and right sides at a constant interval. The inside of the side frame 200 is hollow. Additionally, the reference sign 300 denotes a bumper beam. A bumper beam 300 is installed inside the front bumper provided at a front end portion (front surface) of the vehicle. The bumper beam 300 is an example of the "outer structure" according to the present disclosure. The bumper beam 300 is positioned outside the side frame 200 in the vehicle, and extends in a left-right direction (a width direction of the vehicle). The strength of the bumper beam 300 is set to be lower than the strength of the side frame 200. As illustrated in FIG. 1, the shock absorption device 100 according to the present embodiment is installed between the side frame 200 and the bumper beam 300. The shock absorption devices 100 are provided on the left and right sides, and thus, connect the left and right side frames 200 to the bumper beam 300, respectively. The shock absorption device 100 receives a shock load from a front side through the bumper beam 300 in head-on (front surface) collision of the vehicle. At this time, the shock absorption device 100 deforms in preference to the side frame 200 and absorbs collision energy, thereby suppressing deformation of the frame. Here, as illustrated in FIG. 1, a direction from the bumper beam 300 side to the side frame 200 side (in this example, a rearward direction) is referred to as a load direction. That is, the load direction is a direction in which a load acts on the shock absorption device 100 in vehicle collision.

It should be noted that a place where the shock absorption device according to the present disclosure is installed is not limited to the inside of the front bumper. The shock absorption device can be installed between the frame of the vehicle and an outer structure positioned outside of the frame in the vehicle. For example, the shock absorption device may be installed inside a rear bumper provided at a rear end portion (rear surface) of the vehicle. In this case, in rear-end collision of the vehicle, the shock absorption device receives a shock load from a rear side, deforms in preference to the frame, and absorbs collision energy. Further, when a fender provided on a side surface of the vehicle is assumed as the outer structure, the shock absorption device may be installed between the frame and the fender. In this case, in side collision of the vehicle, the shock absorption device receives a shock load from a side, deforms in preference to the frame, and absorbs collision energy.

Figure 2:
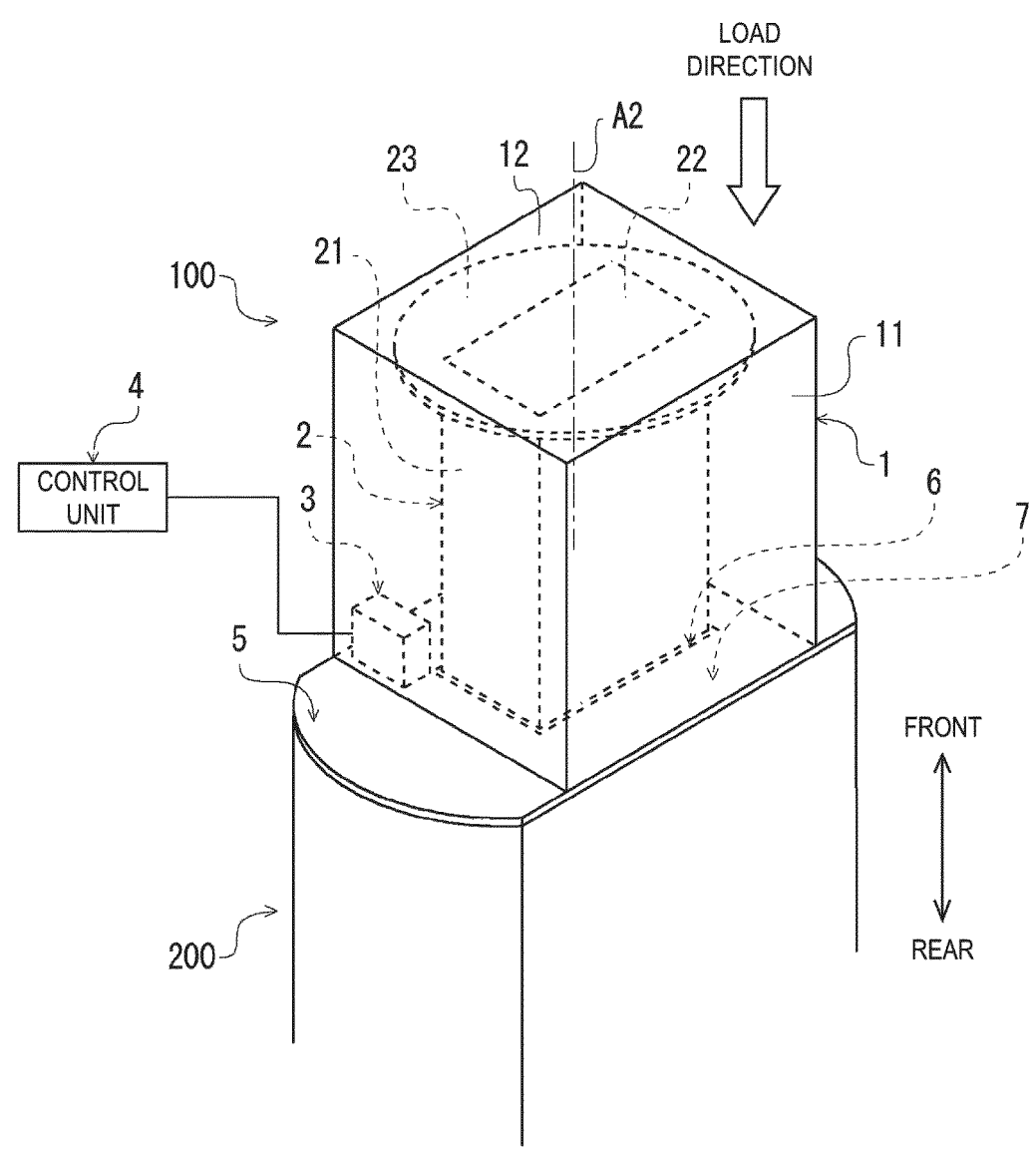
FIG. 2 is a perspective view schematically illustrating the shock absorption device according to the first embodiment.
Figure 3:
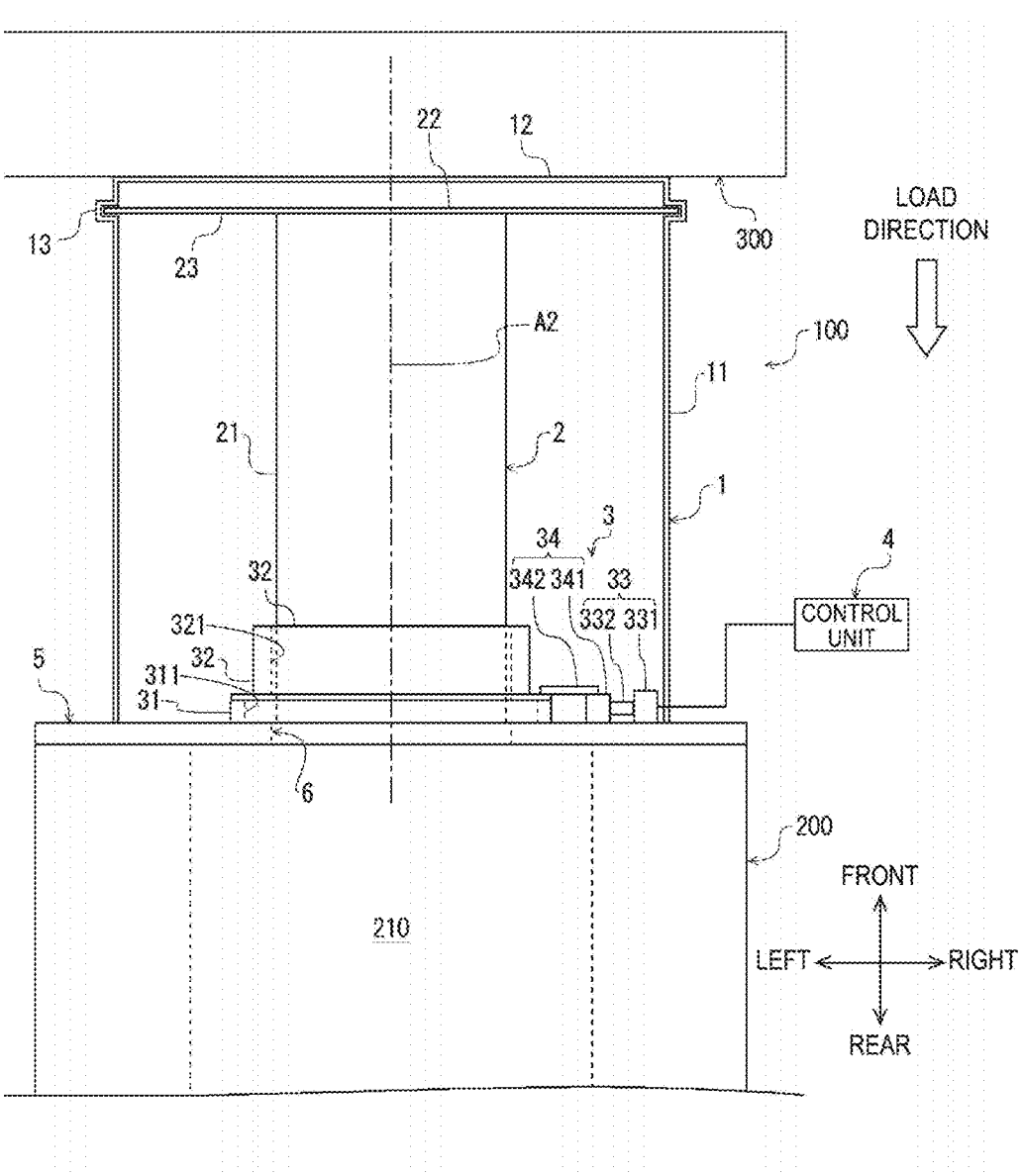
FIG. 3 is a cross-sectional view schematically illustrating the shock absorption device according to the first embodiment.

FIG. 2 is a perspective view schematically illustrating the shock absorption device 100. FIG. 3 is a cross-sectional view schematically illustrating the shock absorption device 100. FIG. 2 and FIG. 3 illustrate a state in which a second shock absorption member denoted by the reference sign 2 is in a first installation state, which will be described later, in a non-collision situation. In addition, in FIG. 2 and FIG. 3, each of configurations of the shock absorption device 100 is simply illustrated. As illustrated in FIG. 2 and FIG. 3, the shock absorption device 100 includes a first shock absorption member 1, a second shock absorption member 2, a switching unit 3, a control unit 4, and a base portion 5.

As illustrated in FIG. 3, each of the first shock absorption member 1 and the second shock absorption member 2 is a member provided between the side frame 200 and the bumper beam 300, and is formed in a tubular shape extending from the side frame 200 side to the bumper beam 300 side (that is, extending in a front-rear direction). The second shock absorption member 2 is installed inside the first shock absorption member 1. The first shock absorption member 1 and the second shock absorption member 2 are coaxially arranged.

The first shock absorption member 1 is a metal member that includes a first tubular body portion 11 having a rectangular tubular shape, and a first lid wall portion 12 that closes one end portion (a front end portion) of the tubular body portion. As illustrated in FIG. 3, a front surface of the first lid wall portion 12, that is, a front end portion of the first shock absorption member 1 is fixed to the bumper beam 300. The base portion 5 is a metal member provided on the side frame 200, and fixes the other end portion (rear end portion) of the first tubular body portion 11. The base portion 5 is formed in a plate shape and is fixed to a front end surface of the side frame 200. As illustrated in FIG. 3, the front end portion of the first shock absorption member 1 is fixed to the bumper beam 300, and the rear end portion of the first shock absorption member 1 is fixed to the base portion 5 provided at the side frame 200. Thus, the side frame 200 and the bumper beam 300 are connected by the first shock absorption member 1. The strength of the first shock absorption member 1 is set to be lower than the strength of the side frame 200. Note that in this example, the base portion 5 is formed as a separate member from the side frame 200, but the base portion according to the present disclosure may be formed as a part of the side frame 200. The second shock absorption member 2 includes a second tubular body portion 21 having a rectangular tubular shape and made of metal, a second lid wall portion 22 that closes one end portion (a front end portion) of the second tubular body portion 21, and a projecting portion 23 protruding outward in a radial direction from an outer peripheral surface near the front end portion of the second tubular body portion 21. The strength of the second tubular body portion 21 is set to be lower than the strength of the side frame 200. The projecting portion 23 is an elastic member formed of a resin material. The outer peripheral portion of the projecting portion 23 is formed in an arc shape having a center on a center axis A2 of the second tubular body portion 21. Here, as illustrated in FIG. 3, the first tubular body portion 11 of the first shock absorption member 1 is formed with a recessed portion 13 recessed radially outward. The projecting portion 23 of the second shock absorption member 2 and the recessed portion 13 of the first shock absorption member 1 are engaged with each other. Thus, the second shock absorption member 2 is held by the first shock absorption member 1. Note that the projecting portion 23 is rotatable about a center axis A1 in a state of being fitted in the recessed portion 13.

Figure 4:
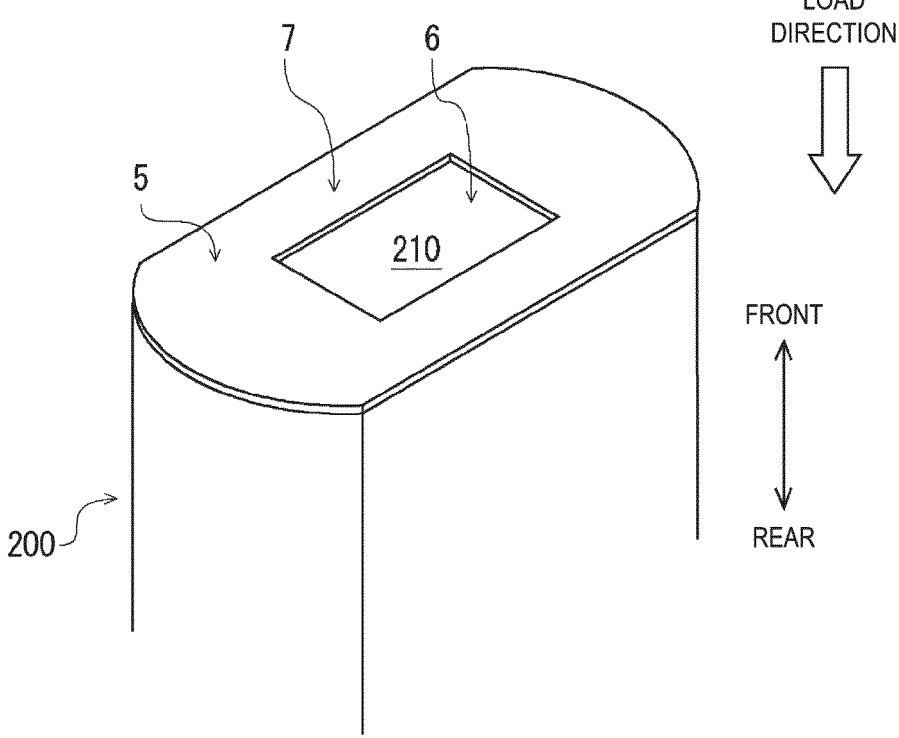
FIG. 4 is a perspective view illustrating a base portion according to the first embodiment.

FIG. 4 is a perspective view illustrating the base portion 5. As illustrated in FIG. 4, a reception portion 6 that is a hole having a rectangular cross section opens in the base portion 5. A shape of the cross section of the reception portion 6 orthogonal to the load direction is similar to an outer shape of the cross section of the second tubular body portion 21 of the second shock absorption member 2 orthogonal to the load direction, and is larger than the outer shape of the cross section of the second tubular body portion 21. The reception portion 6 communicates with an internal space 210 of the side frame 200. Additionally, the base portion 5 is provided with a hole forming portion 7. The hole forming portion 7 is a part of the base portion 5 and is a portion surrounding the reception portion 6 and thereby defining the reception portion 6. In the present embodiment, the hole forming portion 7 corresponds to an example of a "contact portion" in the present disclosure.

Figure 5:
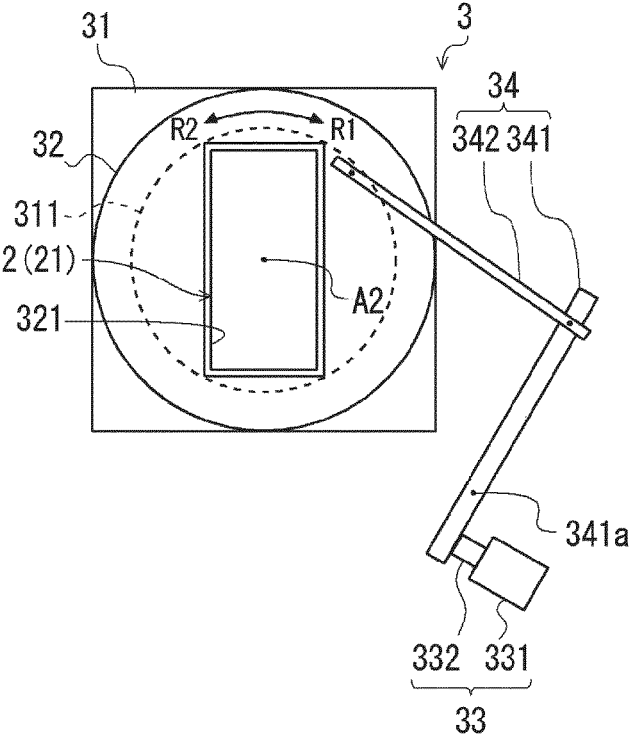
FIG. 5 is a front view illustrating a relationship between a second shock absorption member and a switching unit when the second shock absorption member is in a first installation state in a non-collision situation in the first embodiment.
Figure 6:
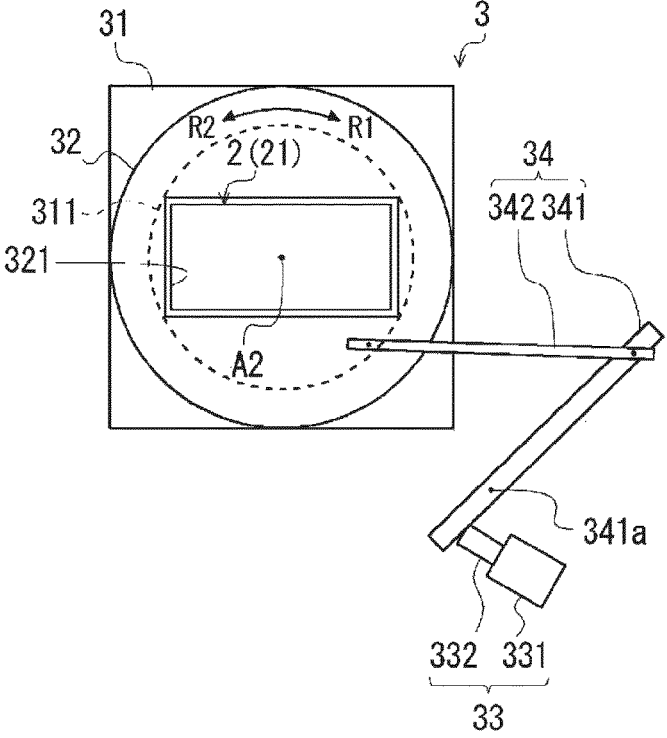
FIG. 6 is a front view illustrating a relationship between the second shock absorption member and the switching unit

FIG. 5 is a front view illustrating a relationship between the second shock absorption member 2 and the switching unit 3 when the second shock absorption member 2 is in the first installation state in a non-collision situation. Additionally, FIG. 6 is a front view illustrating a relationship between the second shock absorption member 2 and the switching unit 3 when the second shock absorption member 2 is in the second installation state in the non-collision situation. FIG. 5 and FIG. 6 illustrate a state in which the second shock absorption member 2 and the switching unit 3 are viewed from the bumper beam 300 side along the load direction. Note that in FIG. 5 and FIG. 6, the first shock absorption member 1 and the projecting portion 23 are not illustrated.

The switching unit 3 is a device that switches an installation state of the second shock absorption member 2 between the first installation state illustrated in FIG. 5 and the second installation state illustrated in FIG. 6. The switching unit 3 of the present example brings the second shock absorption member 2 into the second installation state by rotating the second shock absorption member 2 being in the first installation state about the center axis A2 by 90° in a first rotation direction R1. The switching unit 3 rotates the second shock absorption member 2 being in the second installation state about the center axis A2 by 90° in a second rotation direction R2 opposite to the first rotation direction R1, and brings the second shock absorption member 2 into the first installation state. As illustrated in FIG. 3. FIG. 5, and FIG. 6, the switching unit 3 includes a support plate 31, a rotation stage 32, an actuator 33, and a transmission unit 34. As illustrated in FIG. 3, the support plate 31 is a plate-like member fixed to the base portion 5 in a manner that the support plate 31 overlaps a front surface of the base portion 5. Additionally, the rotation stage 32 is rotatable about the center axis A1 with respect to the support plate 31. A through hole 311 through which the second shock absorption member 2 is inserted is formed in the support plate 31. The size and shape of the first tubular body portion 11 are set in a manner that movement of the second shock absorption member 2 in the load direction with respect to the support plate 31 and rotation of the second shock absorption member 2 about the center axis A2 with respect to the support plate 31 are allowed.

As illustrated in FIG. 3, the rotation stage 32 is a member superposed on a front surface of the support plate 31 and supported by the support plate 31 in a manner that the member is rotatable about the center axis A2 of the second shock absorption member 2. A through hole 321 through which the second shock absorption member 2 is inserted is formed in the rotation stage 32. The size and shape of the through hole 321 are set in a manner that the movement of the second shock absorption member 2 in the load direction with respect to the rotation stage 32 is allowed and the rotation of the second shock absorption member 2 about the center axis A1 with respect to the rotation stage 32 is restricted. Since the relative rotation of the second shock absorption member 2 with respect to the support plate 31 is allowed and the relative rotation of the second shock absorption member 2 with respect to the rotation stage 32 is restricted, the second shock absorption member 2 is rotatable about the center axis A1 together with the rotation stage 32.

As illustrated in FIG. 5 and FIG. 6, the actuator 33 includes a drive unit 331 and a piston 332 held by the drive unit 331. The drive unit 331 is an electric actuator to be driven by a solenoid, and moves the piston 332 forward and backward by being driven in accordance with the control of the control unit 4. A drive method of the drive unit 331 is not limited to the solenoid. The drive unit 331 may be driven by a motor. In addition, the drive unit 331 may move the piston 332 by using combustion energy of an explosive as in the technique disclosed in US 2003/0,167,959 A. The transmission unit 34 is a link mechanism for connecting the rotation stage 32 and the actuator 33, and rotates the rotation stage 32 by converting a forward/backward motion of the piston 332 into a rotation motion and transmitting the rotation motion to the rotation stage 32. The transmission unit 34 includes a rotor 341 and a rod 342. The rotor 341 is a rotation member that is provided in a rotatable manner about a rotating shaft 341a parallel to the load direction and that extends in a direction orthogonal to the rotating shaft 341a. The rod 342 is a rod-shaped member that connects the rotation stage 32 and the rotor 341. The piston 332 is connected to one end portion of the rotor 341, and one end portion of the rod 342 is rotatably connected to the other end portion at the opposite side to the one end portion of the rotor 341 with the rotating shaft 341a interposed therebetween. The other end portion of the rod 342 is rotatably connected to the rotation stage 32.

When the piston 332 is in the first state illustrated in FIG. 5, the second shock absorption member 2 is in the first installation state. In addition, when the piston 332 is in the second state in which the piston 332 protrudes, compared with the first state, as illustrated in FIG. 6, the second shock absorption member 2 is brought into the second installation state. To be specific, when the piston 332 is changed from the first state to the second state by driving of the drive unit 331, the motion of the piston 332 is transmitted to the rotation stage 32 through the transmission unit 34, the rotation stage 32 rotates by 90° in the first rotation direction R1 about the center axis A2, and the second shock absorption member 2 is brought into the second installation state. On the other hand, when the piston 332 is changed from the second state to the first state by driving of the drive unit 331, the rotation stage 32 rotates about the center axis A2 by 90° in the second rotation direction R2, and the second shock absorption member 2 is brought into the first installation state.

FIG. 7 is a front view illustrating a relationship between the second shock absorption member 2 and the base portion 5 when the second shock absorption member 2 is in the first installation state in the non-collision situation. Further, FIG. 8 is a front view illustrating a relationship between the second shock absorption member 2 and the base portion 5 when the second shock absorption member 2 is in the second installation state in the non-collision situation. FIG. 7 and FIG. 8 illustrate a state in which the second shock absorption member 2 and the base portion 5 are viewed from the bumper beam 300 side along the load direction. Note that in FIG. 7 and FIG. 8, the first shock absorption member 1 and the switching unit 3 are not illustrated. In addition, FIG. 9 is a cross-sectional view illustrating a state of the shock absorption device 100 when the second shock absorption member 2 is in the first installation state in the non-collision situation. FIG. 9 illustrates a cross section corresponding to a cross section taken along a line A-A in FIG. 7. Additionally, FIG. is a cross-sectional view illustrating a state of the shock absorption device 100 when the second shock absorption member 2 is in the second installation state in the non-collision situation, FIG. 10 illustrates a cross section corresponding to a cross section taken along a line B-B in FIG. 8. Note that in FIG. 9 and FIG. 10, illustration of the switching unit 3 is omitted.

As illustrated in FIG. 7, the second shock absorption member 2 (more specifically, the second tubular body portion 21) in the first installation state does not overlie the hole forming portion 7 and is accommodated inside the reception portion 6 when viewed from the bumper beam 300 side along the load direction. In other words, the second shock absorption member 2 does not overlap the hole forming portion 7 in the load direction. Thus, as illustrated in FIG. 9, when the second shock absorption member 2 in the first installation state is to be moved in the load direction, the second shock absorption member 2 is received by the reception portion 6 and can enter the internal space 210 of the side frame 200. Thus, when the second shock absorption member 2 is in the first installation state, the second shock absorption member 2 is allowed to move in the load direction. On the other hand, as illustrated in FIG. 8, in the second installation state. When viewed along the load direction, the second shock absorption member 2 is not accommodated inside the reception portion 6, and a part of the second shock absorption member 2 overlaps the hole forming portion 7. That is, the second shock absorption member 2 is displaced with respect to the reception portion 6, the second shock absorption member 2 is positioned before the hole forming portion 7 in the load direction, and at least a part of the second shock absorption member 2 (the second tubular body portion 21) overlaps the hole forming portion 7. Thus, as illustrated in FIG. 10, when the second shock absorption member 2 in the second installation state is moved in the load direction, the hole forming portion 7 comes into contact with the second shock absorption member 2, and thus, the hole forming portion 7 receives the second shock absorption member 2. This restricts the movement of the second shock absorption member 2 in the load direction when the second shock absorption member 2 is in the second installation state.

The control unit 4 predicts a shock load to be received by the vehicle and controls the switching unit 3 based on the prediction result, thereby causing the switching unit 3 to switch the installation state of the second shock absorption member 2. FIG. 11 is a functional block diagram of the control unit 4. The control unit 4 includes an information acquisition unit 41, a determination unit 42, and a switching control unit 43.

The information acquisition unit 41 acquires information necessary for predicting a shock load from various sensors provided in the vehicle during traveling of the vehicle. Specifically, the information acquisition unit 41 acquires traveling information indicating a traveling state of the vehicle from a vehicle speed sensor, an acceleration sensor, a yaw rate sensor, and the like. The information acquisition unit 41 also acquires operation information indicating how the vehicle is being driven and operated from an accelerator sensor, a throttle sensor, a brake sensor, a steering sensor, and the like. In addition, the information acquisition unit 41 acquires obstacle information that is information indicating a state of an obstacle such as an oncoming vehicle from an on-vehicle camera, a millimeter wave radar, and the like.

The determination unit 42 determines which of the first installation state and the second installation state is appropriate as the installation state of the second shock absorption member 2 based on the information acquired by the information acquisition unit 41. More specifically, based on the traveling information, the operation information, and the obstacle information, the determination unit 42 calculates the magnitude of the shock load to be received by the vehicle, the magnitude of the shock load being assumed when the traveling vehicle collides. Then, based on the calculated shock load (hereinafter referred to as the predicted shock load), an appropriate installation state of the second shock absorption member 2 is determined. The determination unit 42 determines that the first installation state is appropriate when the magnitude of the predicted shock load is relatively small, that is, when light collision is predicted, and determines that the second installation state is appropriate when the magnitude of the predicted shock load is relatively large, that is, when heavy collision is predicted. Specifically, the determination unit 42 determines that the first installation state is appropriate when the magnitude of the predicted shock load is less than a predetermined value, and determines that the second installation state is appropriate when the magnitude of the predicted shock load is equal to or larger than the predetermined value. Here, the predetermined value (hereinafter referred to as a predetermined shock value) described above is determined mainly based on the strengths of the side frame 200, the first shock absorption member 1, and the second shock absorption member 2. In this example, the predetermined shock value is determined as a value at which collision energy can be completely absorbed by deformation of only the first shock absorption member 1 among the first shock absorption member 1, the second shock absorption member 2, and the side frame 200 when the magnitude of the shock load is less than the predetermined shock value, and the collision energy cannot be completely absorbed by deformation of only the first shock absorption member 1 when the magnitude of the shock load is equal to or larger than the predetermined shock value. That is, it can be said that collision indicated by a value less than the predetermined shock value is light collision. However, the method of determining the predetermined shock value described above is an example, and is not intended to limit the content of the present disclosure.

The switching control unit 43 controls the drive unit 331 of the actuator 33 based on the determination result of the determination unit 42, and thus, causes the installation state of the second shock absorption member 2 to be switched between the first installation state and the second installation state. Specifically, when the determination unit 42 determines that the first installation state is appropriate, the switching control unit 43 drives the drive unit 331 of the actuator 33 in a manner that the piston 332 is brought into the first state, thereby bringing the second shock absorption member 2 into the first installation state. On the other hand, when the determination unit 42 determines that the second installation state is appropriate, the switching control unit 43 drives the drive unit 331 of the actuator 33 in a manner that the piston 332 is in the second state, thereby bringing the second shock absorption member 2 into the second installation state. The processes of the information acquisition unit 41, the determination unit 42, and the switching control unit 43 are always, continuously, and repeatedly executed while the vehicle is traveling. For example, when the magnitude of the predicted shock load is less than the predetermined shock value because the vehicle is traveling at a low speed, the second shock absorption member 2 is maintained in the first installation state, and when the magnitude of the predicted shock load is equal to or larger than the predetermined shock value because the vehicle is accelerated to a high speed, the second shock absorption member 2 is switched to the second installation state. However, the processing of the control unit 4 is not limited to this method. In other words, it is not necessary to continuously perform the above-described processing while the vehicle is traveling. For example, the second shock absorption member 2 may be set in the first installation state during normal traveling, and whether to maintain the first installation state or switch the installation state to the second installation state may be selected according to the magnitude of the predicted shock load when the determination unit 42 determines that collision cannot be avoided based on the information from the information acquisition unit 41 (before the collision).

The control unit 4 includes a Central Processing Unit (CPU) and a memory. The control unit 4 may be a digital circuit or an analog circuit. Note that the control unit 4 is not an essential constituent element of the shock absorption device according to the present disclosure. For example, an Engine Control Unit (ECU) provided in the vehicle may function as the control unit 4. In addition, the control unit 4 may be configured to include the above-described sensor. For example, the control unit 4 may include a speed sensor.

Shock Absorption

Hereinafter, absorption of collision energy in vehicle collision by the shock absorption device 100 will be described. In the following description, it is assumed that the bumper beam 300 is displaced or deformed toward the side frame 200 (that is, in the load direction) due to a shock load against the bumper beam 300 in head-on collision of the vehicle (hereinafter referred to as a shock-receiving situation). In the shock-receiving situation, the bumper beam 300 is displaced or deformed toward the side frame 200, and thus, the shock load in the load direction acts on the shock absorption device 100.

FIG. 12 is a cross-sectional view illustrating a state of the shock absorption device 100 when the second shock absorption member 2 is in the first installation state in the shock-receiving situation. FIG. 12 illustrates a cross section corresponding to FIG. 9. FIG. 13 is a cross-sectional view illustrating a state of the shock absorption device 100 when the second shock absorption member 2 is in the second installation state in the shock-receiving situation. FIG. 13 illustrates a cross section corresponding to FIG. 10.

First, absorption of collision energy in collision with a relatively small shock load (hereinafter referred to as light collision) will be described. It is to be noted that the shock load here has a magnitude capable of deforming only the first shock absorption member 1. However, a slight shock with a degree that does not deform even the first shock absorption member 1 is excluded. As described above, in the case of the light collision, the switching unit 3 brings the second shock absorption member 2 into the first installation state in a non-shock situation, and thus, the state illustrated in FIG. 9 is obtained.

As illustrated in FIG. 9, the front end portion of the first shock absorption member 1 is fixed to the bumper beam 300. Due to this, in the shock-receiving situation in which the vehicle has collided, the bumper beam 300 is displaced or deformed toward the side frame 200, and thus, a shock load in the load direction acts on the first shock absorption member 1. At this time, the rear end portion of the first shock absorption member 1 is fixed to the base portion 5 provided at the side frame 200. Due to this, the first shock absorption member 1 cannot avoid the shock load received from the bumper beam 300 but receives the shock load. In addition, the shock load also acts on the side frame 200 through the first shock absorption member 1. Here, the strength of the first shock absorption member 1 is set to be lower than the strength of the side frame 200, which causes the first shock absorption member 1 to deform in preference to the side frame 200. As a result, as illustrated in FIG. 12, the first shock absorption member 1 is caught and crushed by the side frame 200 and the bumper beam 300, and thereby buckled and deformed. Thus, the collision energy of the collision is absorbed only by the deformation of the first shock absorption member 1, and the deformation of the side frame 200 is suppressed.

In the shock-receiving situation, the bumper beam 300 is displaced or deformed toward the side frame 200, which causes the shock load in the load direction to act on the second shock absorption member 2 provided between the side frame 200 and the bumper beam 300. On the other hand, as illustrated in FIG. 9, when the second shock absorption member 2 is in the first installation state, the reception portion 6 can receive the second shock absorption member 2. Thus, as illustrated in FIG. 12, the second shock absorption member 2 that has received the shock load in the load direction is received by the reception portion 6 and enters the internal space 210 of the side frame 200. Since the second shock absorption member 2 is allowed to move in the load direction, the second shock absorption member 2 avoids the shock load and avoids deformation.

As described above, in the case of the light collision in which the collision energy is relatively small, the shock absorption device 100 absorbs the collision energy by deforming only the first shock absorption member 1 of the first shock absorption member 1 and the second shock absorption member 2, and suppresses deformation of the side frame 200. Thus, it is only necessary to replace only a distal end portion from the base portion 5 (that is, a component positioned at the outer side (front side) than the side frame 200), and the side frame 200 is not substantially affected.

Next, absorption of collision energy in collision with a relatively large shock load (hereinafter, referred to as heavy collision) will be described. It is to be noted that the shock load here has a magnitude capable of deforming at least the first shock absorption member 1 and the second shock absorption member 2 together. As described above, in the case of the heavy collision, the switching unit 3 brings the second shock absorption member 2 into the second installation state in the non-shock situation, and thus, the state illustrated in FIG. 10 is obtained.

As illustrated in FIG. 13, the first shock absorption member 1 is caught and crushed by the side frame 200 and the bumper beam 300 and buckled and deformed as in the case of the light collision. As a result, the deformation of the first shock absorption member 1 absorbs the collision energy of the collision.

Here, as illustrated in FIG. 10, in a case where the second shock absorption member 2 is in the second installation state, when the second shock absorption member 2 is to be moved in the load direction, the hole forming portion 7 is caused to come into contact with the second shock absorption member 2. Thus, the second shock absorption member 2 that has received the shock load in the load direction is received by the hole forming portion 7. Since the movement of the second shock absorption member 2 in the load direction is restricted, the second shock absorption member 2 cannot avoid the shock load and receives the shock load. Here, the strength of the shock absorption device 100 when the second shock absorption member 2 is in the second installation state is the sum of the strengths of the first shock absorption member 1 and the second shock absorption member 2. The strength of the shock absorption device 100 at this time is set to be equal to or lower than the strength of the side frame 200. That is, when the second shock absorption member 2 is in the second installation state, the first shock absorption member 1 and the second shock absorption member 2 deform in preference to the side frame 200. In addition, when the shock load is larger, the side frame 200 is also deformed, and the shock is absorbed as a whole. Thus, although FIG. 13 illustrates a state in which the first shock absorption member 1 and the second shock absorption member 2 are buckled and deformed, the side frame 200 can also be deformed depending on the magnitude of the collision load and absorb the shock.

As described above, in the case of the heavy collision in which the collision energy is relatively large, the shock absorption device 100 absorbs the collision energy by deforming at least both the first shock absorption member 1 and the second shock absorption member 2. However, when the collision energy cannot be completely absorbed only by the shock absorption device 100, the side frame 200 may also be deformed and absorb the shock, which causes the excess collision energy to be absorbed.

Actions and Effects

As described above, the shock absorption device 100 according to the present embodiment includes the first shock absorption member 1 and the second shock absorption member 2 that are provided between the side frame 200 and the bumper beam 300, and the switching unit 3. In addition, the first shock absorption member 1 is installed in a manner that the first shock absorption member 1 is deformed preferentially over the side flame 200 in the shock-receiving situation. Then, the switching unit 3 can switch the installation state of the second shock absorption member 2 between the first installation state in which the second shock absorption member 2 avoids the shock load in the shock-receiving situation and the second installation state in which the second shock absorption member 2 receives the shock load and deforms together with the first shock absorption member in the shock-receiving situation.

Here, it is preferable that the strength of the shock absorption device 100 be high because large collision energy is caused to be absorbed, because an occupant can be more reliably protected even in heavy collision in which collision energy is relatively large. On the other hand, in light collision in which collision energy is relatively small, when the strength of the shock absorption device 100 is high, a large shock load is required to deform the shock absorption device 100, which may result in the occurrence of a case where the shock absorption device 100 cannot be sufficiently deformed and cannot sufficiently absorb the collision energy. As a result, there is a concern that the side frame 200 may be deformed and the shock may be transmitted to the occupant. Thus, in the light collision, it is preferable that the strength of the shock absorption device 100 be low from the viewpoint of repairability of the vehicle and from the viewpoint of occupant protection because even small collision energy can be absorbed by deformation of the shock absorption device 100.

On the other hand, the shock absorption device 100 can switch the installation state of the second shock absorption member 2 between the first installation state in which the second shock absorption member 2 avoids the shock load and the second installation state in which the second shock absorption member 2 receives the shock load. Thus, the shock absorption device 100 can switch the strength against the shock load. According to this configuration, in heavy collision, the second shock absorption member 2 is brought into the second installation state in advance to increase the strength thereof, thereby absorbing relatively large collision energy. On the other hand, in light collision, the second shock absorption member 2 is set to the first installation state to reduce the strength, thereby absorbing relatively small collision energy and suppressing the transmission of the shock to the side frame 200. As a result, deformation of the side frame 200 can be suppressed while the occupant is reliably protected from the shock due to the collision, and repairability of the vehicle can be unproved.

Further, the shock absorption device 100 according to the present embodiment includes the base portion 5 that is provided at the side frame 200 and that fixes the first shock absorption member 1, the reception portion 6 opened in the base portion 5, and the hole forming portion 7 provided at the base portion 5. Further, the reception portion 6 receives the second shock absorption member 2 in the first installation state in the shock-receiving situation and allows movement of the second shock absorption member 2 to the side frame 200 side. The hole forming portion 7 comes into contact with the second shock absorption member 2 being in the second installation state in the shock-receiving situation, and restricts movement of the second shock absorption member 2 to the side frame 200 side. Thus, when the second shock absorption member 2 is in the first installation state, the second shock absorption member 2 can avoid the shock load, and when the second shock absorption member 2 is in the second installation state, the second shock absorption member 2 can receive the shock load. In addition, since the first shock absorption member 1 is fixed to the base portion 5, fixing strength of the first shock absorption member 1 is ensured, and the first shock absorption member 1 can be suitably deformed even when the shock load acts from a direction deviated from the load direction.

Furthermore, in the shock absorption device 100 according to the present embodiment, the hole forming portion 7 is formed as a part of the base portion 5 in a manner that the reception portion 6 is surrounded. Then, by rotating the second shock absorption member 2 with respect to the reception portion 6, the switching unit 3 switches the installation state between the first installation state in which the reception portion 6 can receive the second shock absorption member 2 and the second installation state in which the hole forming portion 7 restricts movement of the second shock absorption member 2 to the side frame 200 side. Thus, the installation state of the second shock absorption member 2 can be switched between the first installation state and the second installation state. Note that in the present example, the installation state is switched by rotating the second shock absorption member 2 with respect to the reception portion 6, but the present disclosure is not limited to the rotation. For example, the switching unit 3 may switch the installation state of the second shock absorption member 2 by moving the second shock absorption member 2 in parallel with respect to the reception portion 6. That is, the switching unit 3 may switch the installation state of the second shock absorption member 2 by displacing the second shock absorption member 2 with respect to the reception portion 6. Note that in this specification, displacement refers to a change in position and includes parallel movement and rotation.

Further, in the shock absorption device 100 according to the present embodiment, each of the first shock absorption member 1 and the second shock absorption member 2 is formed in a tubular shape extending from the side frame 200 side to the bumper beam 300 side, and the second shock absorption member 2 is installed inside the first shock absorption member 1. According to this configuration, installing the second shock absorption member 2 inside the first shock absorption member 1 can contribute to space saving. However, the present disclosure is not limited thereto, and the first shock absorption member and the second shock absorption member may be disposed in parallel.

Further, in the shock absorption device 100 according to the present embodiment, the projecting portion 23 protruding toward the first shock absorption member 1 is formed on the outer peripheral surface of the second shock absorption member 2, and the projecting portion 23 is engaged with the inner peripheral surface of the first shock absorption member 1. Thus, the second shock absorption member 2 is held by the first shock absorption member 1. This can ensure the holding strength of the second shock absorption member 2.

Then, as illustrated in FIG. 13, when the second shock absorption member 2 is in the second installation state in the shock-receiving situation, the projecting portion 23 guides the first shock absorption member 1 in a manner that the first shock absorption member 1 buckles along the second shock absorption member 2. Thus, the deformation of the first shock absorption member 1 along the load direction is maintained, which causes the first shock absorption member 1 to appropriately absorb the collision energy. Note that the projecting portion is not an essential configuration of the present disclosure.

Here, as illustrated in FIG. 10, in the second installation state, the rear end portion of the second shock absorption member 2 is in contact with the hole forming portion 7 formed in the base portion 5. At this time, when a distance from the base portion 5 to the front end portion of the first shock absorption member 1 is defined as d1 and a distance from the base portion 5 to the front end portion of the second shock absorption member 2 is defined as d2, d1>d2 is satisfied as illustrated in FIG. 10. That is, the end portion of the first shock absorption member 1 on the bumper beam 300 side is positioned closer to the bumper beam 300 side than the end portion of the second shock absorption member 2 on the bumper beam 300 side. According to this, when the second shock absorption member 2 is in the second installation state in the shock-receiving situation in which the bumper beam 300 is displaced or deformed toward the side frame 200 due to the shock load, deformation of the first shock absorption member 1 close to the bumper beam 300 is first started, and then deformation of the second shock absorption member 2 is started. In other words, a timing at which the deformation of the first shock absorption member 1 starts is different from a timing at which the deformation of the second shock absorption member 2 starts. In general, deformation of a material requires a large load at the start timing thereof, and once the deformation starts, the large load is not required to continue the deformation. Thus, when the first shock absorption member 1 and the second shock absorption member 2 are installed in a manner that the start timing of the deformation of the first shock absorption member 1 and the start timing of the deformation of the second shock absorption member 2 coincide with each other, a large shock load is required to simultaneously start the deformation of the first shock absorption member 1 and the deformation of the second shock absorption member 2. On the other hand, in the shock absorption device 100, the timing at which the deformation of the first shock absorption member 1 starts and the timing at which the deformation of the second shock absorption member 2 starts are made different from each other. Thus, the deformation of the first shock absorption member 1 and the deformation of the second shock absorption member 2 easily start. As a result, the collision energy can be absorbed more reliably and the deformation of the side frame 200 can be suppressed and the occupant can be protected more reliably. Note that in the present example, the first shock absorption member 1 is configured to start deforming earlier than the second shock absorption member 2, but the second shock absorption member 2 may be configured to start deforming earlier than the first shock absorption member 1. That is, the timing at which the deformation of the first shock absorption member 1 starts and the timing at which the deformation of the second shock absorption member 2 starts may be different from each other. However, the present disclosure is not limited thereto, and the first shock absorption member and the second shock absorption member may be configured to start deformation at the same time.

Note that the switching unit according to the present disclosure is not limited to the aspect described above. For example, an elastic force of a spring or the like may be used to bias the second shock absorption member to bring the installation stale into the first installation state or the second installation state during normal operation, and when the installation state needs to be switched, a solenoid or the like may be used to temporarily switch the installation stale, and then the elastic force described above may return the installation state to the original installation state.

Modified Examples of First Embodiment

Hereinafter, a modified example of the first embodiment will be described focusing on a difference from the shock absorption device 100, and configurations similar to those of the shock absorption device 100 will be denoted by the same reference signs, and detailed description thereof will be omitted.

First Modified Example of First Embodiment

FIG. 14 is a cross-sectional view illustrating a state of a shock absorption device 100A when the second shock absorption member 2A is in the first installation state in a non-collision situation in a first modified example of the first embodiment. As illustrated in FIG. 14, a second shock absorption member 2A of the shock absorption device 100A according to the first modified example of the first embodiment includes a projecting portion 24 protruding radially outward from the outer peripheral surface near the center of the second tubular body portion 21 in addition to the projecting portion 23 protruding radially outward from the outer peripheral surface near the front end portion of the second tubular body portion 21. In addition, a first shock absorption member 1A of the shock absorption device 100A includes a recessed portion 14 engaged with the projecting portion 24 in addition to the recessed portion 13 engaged with the projecting portion 23. The projecting portion 23 is fitted to the recessed portion 13, and the projecting portion 24 is fitted to the recessed portion 14, whereby the second shock absorption member 2 is held by the first shock absorption member 1A. This can enhance the holding strength of the second shock absorption member 2A.

Second Modified Example of First Embodiment

FIG. 15 is a perspective view illustrating a state of a shock absorption device 100B when a second shock absorption member 2B is in the first installation state in a non-collision situation in a second modified example of the first embodiment. FIG. 15 illustrates only the second shock absorption member 2B and a base portion 5B. FIG. 16 is a front view of the base portion 5B according to the second modified example of the first embodiment. As illustrated in FIG. 15, the reception portion 6 is not opened in the base portion 5B of the shock absorption device 100B in the non-collision situation. Here, the reference sign L1 in FIG. 16 indicates a line (projected contour line) obtained by projecting a contour line of the rear end portion of the second shock absorption member 2B (that is, the rear end portion of the second tubular body portion 21) being in the first installation state onto the base portion 5B. As illustrated in FIG. 16, a portion on L1 of the base portion 5B, that is, a portion of the second shock absorption member 2B that comes into contact with the second tubular body portion 21 in a collided situation is formed as a fragile portion 51 that is easily fractured. A part of the fragile portion 51 is formed as a thin portion 511 that is thinner than the other portion. Thus, the fragile portion 51 is easily fractured. Since the fragile portion 51 is formed on the projected contour line L1, the reception portion 6 capable of receiving the second shock absorption member 2B in the first installation state is formed by breaking the fragile portion 51. FIG. 17 is a perspective view illustrating a state of the shock absorption device 100B when the second shock absorption member 2B is in the first installation state in the collided situation in the second modified example of the first embodiment. FIG. 17 illustrates only the second shock absorption member 2B and the base portion 5B. In the collided situation, the second shock absorption member 2B is pressed to the side frame 200 side by the shock load in the load direction, which causes the second shock absorption member 2B and the fragile portion 51 of the base portion 5B to come into contact with each other. Then, as illustrated in FIG. 17, the fragile portion 51 is fractured by receiving a load from the second shock absorption member 2B and thereby, the reception portion 6 is opened. Thus, the second shock absorption member 2B that has received the shock load in the load direction is received by the reception portion 6 and enters the internal space 210 of the side frame 200. Since the second shock absorption member 2B is allowed to move in the load direction, the second shock absorption member 2B avoids the shock load and avoids deformation.

Here, as illustrated in FIG. 15, the rear end portion of the second tubular body portion 21 serving as the end portion of the second shock absorption member 2B on the side facing the base portion 5B includes a contact region 25 that comes into contact with the fragile portion 51 when the second shock absorption member 2B is in at least the first installation state in the shock-receiving situation, and a non-contact region 26 that does not come into contact with the fragile portion 51. The non-contact region 26 is formed by cutting out a part of the rear end portion of the second tubular body portion 21 in an arch shape. According to this configuration, since the load by the second shock absorption member 2B is concentrated on the contact portion between the contact region 25 and the fragile portion 51, the fragile portion 51 is easily fractured.

Second Embodiment

FIG. 18 is a cross-sectional view illustrating a state of a shock absorption device 100C when the second shock absorption member 2 is in the first installation state in the non-collision situation in the second embodiment. FIG. 19 is a cross-sectional view illustrating a state of the shock absorption device 100C when the second shock absorption member 2 is in the second installation state in the non-collision situation in the second embodiment. Hereinafter, the shock absorption device 100C according to the second embodiment will be described mainly regarding differences from the shock absorption device 100 according to the first embodiment, and configurations similar to those of the shock absorption device 100 will be denoted by the same reference signs, and detailed description will be omitted.

As illustrated in FIG. 18 and FIG. 19, the shock absorption device 100C includes a switching unit 3C provided at the base portion 5 and a piston 8 held by the switching unit 3C. The switching unit 3C is an electric actuator that moves the piston 8 forward and backward by being driven in accordance with the control of the control unit 4. The switching unit 3C is disposed in the internal space 210 of the side frame 200, and is attached to the rear surface of the base portion 5. The switching unit 3C is different from the switching unit 3 of the shock absorption device 100 according to the first embodiment in that the switching unit 3C switches the installation state of the second shock absorption member 2 not by displacing the second shock absorption member 2 with respect to the reception portion 6 but by displacing the piston 8 with respect to the second shock absorption member 2. When the piston 8 is at a first position illustrated in FIG. 18, the second shock absorption member 2 is brought into the first installation state. Additionally, when the piston 8 is at a second position protruding from the first position as illustrated in FIG. 19, the second shock absorption member 2 is in the second installation state. In the present embodiment, the piston 8 corresponds to an example of the "contact portion" according to the present disclosure.

As illustrated in FIG. 18, when the second shock absorption member 2 is in the first installation state, the second shock absorption member 2 is positioned before the hole forming portion 7 in the load direction and does not overlap the hole forming portion 7. Further, the piston 8 being at the first position in the load direction does not overlap the second shock absorption member 2. Thus, as illustrated in FIG. 18, when the second shock absorption member 2 being in the first installation state is to be moved in the load direction, the second shock absorption member 2 is received by the reception portion 6 and can enter the internal space 210 of the side frame 200. Thus, when the second shock absorption member 2 is in the first installation state, the second shock absorption member 2 is allowed to move in the load direction. On the other hand, as illustrated in FIG. 19, in the second installation state, the second shock absorption member 2 is positioned before the piston 8 in the load direction, and the piston 8 being at the second position overlaps the second shock absorption member 2. Because of this, when the second shock absorption member 2 being in the second installation state is to be moved in the load direction, the piston 8 comes into contact with the second shock absorption member 2, whereby the second shock absorption member 2 is received by the piston 8. Thus, when the second shock absorption member 2 is in the second installation state, the movement of the second shock absorption member 2 in the load direction is restricted.

In the shock absorption device 100C according to the second embodiment, similarly to the first embodiment, the control unit 4 predicts the shock load that the vehicle receives, and controls the switching unit 3C based on the prediction result, thereby causing the switching unit 3C to switch the installation state of the second shock absorption member 2. The control unit 4 controls the switching unit 3C in a manner that the second shock absorption member 2 is brought into the first installation state in light collision and the second shock absorption member 2 is brought into the second installation state in heavy collision.

Hereinafter, absorption of collision energy in vehicle collision by the shock absorption device 100C in the shock-receiving situation will be described. FIG. 20 is a cross-sectional view illustrating a state of the shock absorption device 100C when the second shock absorption member 2 is in the first installation state in the shock-receiving situation in the second embodiment. FIG. 21 is a cross-sectional view illustrating a state of the shock absorption device 100C when the second shock absorption member 2 is in the second installation state in the shock-receiving situation in the second embodiment. Since the behavior of the first shock absorption member 1 in the shock-receiving situation is similar to that of the first embodiment, detailed description thereof will be omitted.

First, as illustrated in FIG. 20, when the second shock absorption member 2 is in the first installation state, the reception portion 6 can receive the second shock absorption member 2. Thus, as illustrated in FIG. 20, the second shock absorption member 2 that has received the shock load in the load direction is received by the reception portion 6 and enters the internal space 210 of the side frame 200. Since the second shock absorption member 2 is allowed to move in the load direction, the second shock absorption member 2 avoids the shock load and avoids deformation. Due to this, in the case of light collision in which collision energy is relatively small, the shock absorption device 100C absorbs the collision energy by deforming only the first shock absorption member 1 of the first shock absorption member 1 and the second shock absorption member 2, and suppresses deformation of the side frame 200.

Next, as illustrated in FIG. 21, in a case where the second shock absorption member 2 is in the second installation state, when the second shock absorption member 2 is to be moved in the load direction, the piston 8 comes into contact with the second shock absorption member 2. Thus, the second shock absorption member 2 that has received the shock load in the load direction is received by the piston 8. Since the movement of the second shock absorption member 2 in the load direction is restricted, the second shock absorption member 2 cannot avoid the shock load and receives the shock load. As a result, as illustrated in FIG. 21, the second shock absorption member 2 is caught and crushed by the piston 8 and the bumper beam 300, and buckled and deformed. Thus, in the case of heavy collision in which collision energy is relatively large, the shock absorption device 100C absorbs the collision energy by deforming at least both the first shock absorption member 1 and the second shock absorption member 2. However, when the collision energy cannot be absorbed even by the deformation, the side frame 200 is also deformed and absorbs the collision energy.

As described above, in the shock absorption device 100C according to the present embodiment, the switching unit 3C displaces the piston 8 with respect to the second shock absorption member 2, and switches the installation state of the second shock absorption member 2 between the first installation state and the second installation state. In the present embodiment, the first installation state is a state in which the piston 8 is disposed at a first position at which the second shock absorption member 2 is caused to enter the reception portion 6. On the other hand, the second installation state is a state in which the piston 8 is disposed at a second position at which entry of the second shock absorption member 2 into the reception portion 6 is prevented.

The shock absorption device 100C according to the second embodiment can switch the installation state of the second shock absorption member 2, and thus, can change the strength of the shock absorption device 100C against the shock load. As a result, according to the shock absorption device 100C of the second embodiment, similarly to the first embodiment, the deformation of the side frame 200 is suppressed in the case of light collision, and thus, the repairability of the vehicle can be improved, while the occupant is reliably protected from the shock due to the collision.

Modified Examples of Second Embodiment

Hereinafter, modified examples of the second embodiment will be described mainly regarding differences from the shock absorption device 100C, and configurations similar to those of the shock absorption device 100C will be denoted by the same reference signs, and detailed description will be omitted.

First Modified Example of Second Embodiment

FIG. 22 is a cross-sectional view illustrating a state of a shock absorption device 100D when a second shock absorption member 2D is in the first installation state in a non-collision situation in a first modified example of the second embodiment. FIG. 23 is a cross-sectional view illustrating a state of the shock absorption device 100D when the second shock absorption member 2D is in the first installation state in a collided situation in the first modified example of the second embodiment.

As illustrated in FIG. 22, in the shock absorption device 100D, the second tubular body portion 21 of the second shock absorption member 2D is formed in a tapered shape whose width gradually increases from the side frame 200 side to the bumper beam 300 side. More specifically, the outer shape of a cross section of the second tubular body portion 21 of the second shock absorption member 2D, the cross section being orthogonal to the load direction, has a size being smaller than the size of a cross section of the reception portion 6 at the rear end portion that is the end portion on the side frame 200 side. The outer shape of the cross section orthogonal to the load direction has a size gradually increasing to the bumper beam 300 side, and the size thereof is larger than the size of the cross section of the reception portion 6 at the front end surface that is the end portion on the bumper beam 300 side.

As illustrated in FIG. 23, when the second shock absorption member 2D is in the first installation state in the collided situation, the second shock absorption member 2D that has received the shock load in the load direction is received by the reception portion 6 and enters the internal space 210 of the side frame 200. At this time, during the movement of the second shock absorption member 2D in the load direction, the second tubular body portion 21 comes into contact with an internal wall of the reception portion 6, which generates resistance against the movement of the second shock absorption member 2D in the load direction. Since the outer shape of the cross section of the second tubular body portion 21 has the size gradually increasing to the bumper beam 300 side, the resistance also increases as a movement amount of the second shock absorption member 2D in the load direction increases. In a case where the shock load is larger than an expected shock load when the second shock absorption member 2D is in the first installation state, the collision energy cannot be fully absorbed only by the deformation of the first shock absorption member 1 in some cases. In this case, there is a concern that the first shock absorption member 1 is completely crushed and the bumper beam 300 collides with the side frame 200 with the first shock absorption member 1 interposed therebetween so-called bottom hitting). On the other hand, according to the shock absorption device 100D, a resistance force generated when the second shock absorption member 2D comes into contact with the internal wall of the reception portion 6 serves as a brake, which can prevent the bottom hitting.

Second Modified Example of Second Embodiment

FIG. 24 is a perspective view illustrating a state of a shock absorption device 100E when a second shock absorption member 2E is in the first installation state in a non-collision situation in a second modified example of the second embodiment. FIG. 24 illustrates only the second shock absorption member 2E and a base portion 5E. FIG. 25 is a cross-sectional view illustrating a state of the shock absorption device 100E when the second shock absorption member 2E is in the first installation state in the non-collision situation in the second modified example of the second embodiment. FIG. 26 is a cross-sectional view illustrating a state of the shock absorption device 100E when the second shock absorption member 2E is in the second installation state in the non-collision situation in the second modified example of the second embodiment. FIG. 27 is a cross-sectional view illustrating a state of the shock absorption device 100E when the second shock absorption member 2E is in the first installation state in a collided situation in the second modified example of the second embodiment. FIG. 28 is a cross-sectional view illustrating a state of the shock absorption device 100E when the second shock absorption member 2E is in the second installation state in the collided situation in the second modified example of the second embodiment.

As illustrated in FIG. 24 to FIG. 28, in the shock absorption device 100E, a first shock absorption member 1E is installed inside the second shock absorption member 2E. The first shock absorption member 1E is a metal member. As illustrated in FIG. 25, the first shock absorption member 1 includes the first tubular body portion 11 having a rectangular tubular shape and extending from the side frame 200 side to the bumper beam 300 side, the first lid wall portion 12 that closes one end portion (a front end portion) of the first tubular body portion 11, and the protruding portion 15 protruding radially outward from an outer peripheral surface near the front end portion of the first tubular body portion 11. The front surface of the first lid wall portion 12, that is, the front end portion of the first shock absorption member 1E is fixed to the bumper beam 300, and the rear end portion is fixed to the base portion 5E provided at the side frame 200, thereby allowing the first shock absorption member 1E to connect the side frame 200 and the bumper beam 300. As illustrated in FIG. 24, the second shock absorption member 2E is a metal member, and includes a pair of main body portions 27 and 27 each of which has a substantially U-shaped cross section and extends from the side frame 200 side to the bumper beam 300 side, and a beam 28 connecting rear end portions of the pair of main body portions 27 and 27 to each other. The base portion 5E is formed with a pair of reception portions 6E and 6E that are through holes each of which receives the corresponding one of the pair of main body portions 27 and 27. The pair of main body portions 27 and 27 are connected to each other through the beam 28 in the internal space 210 of the side frame 200 in a state of being inserted into the pair of reception portions 6E and 6E. Additionally, the front end portions of the pair of main body portions 27 and 27 are connected to the protruding portion 15 of the first shock absorption member 1E. Note that the protruding portion 15 may be disposed at a distance from the main body portion 27.

As illustrated in FIG. 25, when the second shock absorption member 2E is in the first installation state, the piston 8 being at the first position does not overlap the second shock absorption member 2E in the load direction. This allows movement of the second shock absorption member 2E in the load direction when the second shock absorption member 2E is in the first installation state. On the other hand, as illustrated in FIG. 26, in the second installation state, the second shock absorption member 2E is positioned before the piston 8 in the load direction, and the piston 8 being at the second position overlaps the second shock absorption member 2E. This restricts movement of the second shock absorption member 2E in the load direction when the second shock absorption member 2E is in the second installation state.

As illustrated in FIG. 27, when the second shock absorption member 2E is in the first installation state in the collided situation, the movement of the second shock absorption member 2E in the load direction is allowed, which causes the second shock absorption member 2E to avoid the shock load and to avoid deformation. Thus, in the case of light collision in which collision energy is relatively small, the shock absorption device 100E absorbs the collision energy by deforming only the first shock absorption member 1E of the first shock absorption member 1E and the second shock absorption member 2E, and suppresses deformation of the side frame 200. As illustrated in FIG. 28, when the second shock absorption member 2E is in the second installation state in the collided situation, the movement of the second shock absorption member 2E in the load direction is restricted, which causes the second shock absorption member 2E to receive the shock load and to be buckled and deformed. Thus, in the case of heavy collision in which collision energy is relatively large, the shock absorption device 100E absorbs the collision energy by deforming at least both the first shock absorption member 1E and the second shock absorption member 2E. However, when the collision energy cannot be absorbed even by the deformation, the side frame 200 is also deformed and absorbs the collision energy.

Also in the shock absorption device 100E according to the second modified example of the second embodiment, the strength of the shock absorption device 100E against the shock load can be switched by switching the installation state of the second shock absorption member 2E between the first installation state and the second installation state. As a result, similarly to the above-described embodiments, it is possible to suppress deformation of the side frame 200 in the case of light collision and to improve repairability of the vehicle, while reliably protecting the occupant from the shock due to the collision. That is, in the technique of the present disclosure, the first shock absorption member may be installed inside the second shock absorption member.

Third Embodiment

FIG. 29 is a top view illustrating a state of a shock absorption device 100F when a second shock absorption member 2F is in the first installation state in a non-collision situation in a third embodiment. FIG. 30 is a top view illustrating a state of the shock absorption device 100F when the second shock absorption member 2F is in the first installation state in the non-collision situation in the third
embodiment. FIG. 31 is a top view illustrating a state of the
shock absorption device 100F when the second shock
absorption member 2F is in the first installation state in a
collided situation in the third embodiment. FIG. 32 is a top
view illustrating a state of the shock absorption device 100F
when the second shock absorption member 2F is in the
second installation state in the collided situation in the third
embodiment. Hereinafter, the shock absorption device 100F
according to the third embodiment will be described mainly
regarding differences from the shock absorption device 100
according to the first embodiment, and configurations simi-
lar to those of the shock absorption device 100 will be
denoted by the same reference signs, and detailed descrip-
tion will be omitted.

As illustrated in FIG. 29, the shock absorption device
100F according to the third embodiment includes a pair of
left and right second shock absorption members 2F and 2F.
Note that the number of the second shock absorption mem-
bers 2F is not limited to this number, and may be one, or
three or more. The second shock absorption member 2F is a
rod-shaped or plate-shaped member made of metal, and one
end portion thereof is connected to the side frame 200
through a base portion 5F. The second shock absorption
member 2F extends from the side frame 200 side to the
bumper beam 300 side, and is inclined with respect to the
load direction. The other end portion of the second shock
absorption member 2F is not connected to the bumper beam
300 in the first installation state illustrated in FIG. 29, and is
connected to the bumper beam 300 by a switching unit 3F
in the second installation state illustrated in FIG. 30. Here,
a connection portion between the second shock absorption
member 2F and the side frame 200 (more specifically, the
base portion 5F provided at the side frame 200) is referred
to as a frame-side connection portion C1, and a connection
portion between the second shock absorption member 2F
and the bumper beam 300 is referred to as an outer connec-
tion portion C2.

The second shock absorption member 2F is installed in
the second installation state illustrated in FIG. 30 during
normal traveling of the vehicle. Two switching units 3F are
provided corresponding to the pair of second shock absorp-
tion members 2F and 2F. The switching unit 3F brings the
installation state of the second shock absorption member 2F
into the first installation state by releasing the connection at
the outer connection portion C2 as illustrated in FIG. 29, and
maintains the installation state of the second shock absorp-
tion member 2F in the second installation state by main-
taining the connection at the outer connection portion C2 as
illustrated in FIG. 30. The switching unit 3F is provided at
the bumper beam 300 and includes a drive unit 35 and a
connection member 36. The drive unit 35 is an electric
actuator to be driven by a solenoid. The connection member
36 connects the second shock absorption member 2F and the
bumper beam 300 by being engaged with the second shock
absorption member 2F. The drive unit 35 is driven in
accordance with the control of the control unit 4 and moves
the connection member 36, thereby switching between a
disengaged state in which the connection member 36 and the
second shock absorption member 2F are disengaged as
illustrated in FIG. 29 and an engaged state in which the
connection member 36 and the second shock absorption
member 2F are engaged as illustrated in FIG. 30. When the
connection member 36 changes from the engaged state to
the disengaged state, the connection at the outer connection
portion C2 is released, and the installation state of the
second shock absorption member 2F changes from the second installation state to the first installation state. On the
other hand, when the connection member 36 changes from
the disengaged state to the engaged state, the connected state
of the outer connection portion C2 is formed and the
installation state of the second shock absorption member 2F
changes from the first installation state to the second instal-
lation state.

In the shock absorption device 100F according to the third
embodiment, the control unit 4 predicts the shock load to be
received in the vehicle and controls the drive unit 35 of the
switching unit 3F based on the prediction result, thereby
causing the switching unit 3F to switch the installation state
of the second shock absorption member 2F. The switching
unit 3F maintains the installation state of the second shock
absorption member 2F in the second installation state during
normal traveling, maintains the second installation state
when collision is detected and heavy collision is predicted,
and switches the installation state to the first installation
state when light collision is predicted. However, the present
disclosure is not limited to such a configuration. The switch-
ing unit 3F may be configured to maintain the installation
state of the second shock absorption member 2F in the first
installation state during normal traveling, and configured to
switch the installation state to the second installation state
when collision is detected and heavy collision is predicted.

Hereinafter, absorption of collision energy in vehicle
collision by the shock absorption device 100F in a shock-
receiving situation will be described. FIG. 31 is a top view
illustrating a state of the shock absorption device 100F when
the second shock absorption member 2F is in the first
installation state in the shock-receiving situation in the third
embodiment. FIG. 32 is a top view illustrating a state of the
shock absorption device 100E when the second shock
absorption member 2F is in the second installation state in
the shock-receiving situation in the third embodiment. Since
the behavior of the first shock absorption member 1 in the
shock-receiving situation is similar to that of the first
embodiment, detailed description thereof will be omitted.

First, as illustrated in FIG. 31, when the second shock
absorption member 2F is in the first installation state, the
connection at the outer connection portion C2 is released,
which brings the second shock absorption member 2F into
a connected state only at the frame-side connection portion
C1. Thus, the second shock absorption member 2F that has
received the shock load in the load direction changes its
posture in a manner that the second shock absorption
member 2F falls down toward the side frame 200 with the
outer connection portion C2 serving as a fulcrum point while
slightly bending. This causes the second shock absorption
member 2F to avoid the shock load, which avoids buckling
deformation. As a result, as illustrated in FIG. 31, in the case
of light collision in which collision energy is relatively
small, the shock absorption device 100F absorbs the colli-
sion energy by causing only the first shock absorption
member 1 of the first shock absorption member 1 and the
second shock absorption member 2F to buckle and deform,
thereby suppressing deformation of the side frame 200.

Next, as illustrated in FIG. 32, when the second shock
absorption member 2F is in the second installation state, the
connection at the outer connection portion C2 is maintained.
Thus, the second shock absorption member 2F is connected
at both the frame-side connection portion C1 and the outer
connection portion C2. According to this, since the posture
change of the second shock absorption member 2F is
restricted, the second shock absorption member 2F cannot
avoid the shock load and receives the shock load. Thus, as
illustrated in FIG. 32, the second shock absorption member 2F is caught and crushed by the side frame 200 and the bumper beam 300 and buckled and deformed. As a result, in the case of heavy collision in which collision energy is relatively large, the shock absorption device 100F absorbs the collision energy by causing at least both the first shock absorption member 1 and the second shock absorption member 2F to buckle and deform. However, when the collision energy cannot be absorbed, the side frame 200 is also deformed and absorbs the collision energy.

As described above, in the shock absorption device 100F according to the present embodiment, the connection of the outer connection portion C2 can be released by the switching unit 3F, and when the second shock absorption member 2F is in the first installation state in the shock-receiving situation, the connection of the outer connection portion C2 is released by the switching portion 3F, whereby the second shock absorption member 2F avoids the shock load. On the other hand, when the second shock absorption member 2F is in the second installation state in the shock-receiving situation, the second shock absorption member 2F is configured to receive the shock load by maintaining the connection at both the frame-side connection portion C1 and the outer connection portion C2.

The shock absorption device 100F according to the third embodiment can switch the strength of the shock absorption device 100F against the shock load by switching the installation state of the second shock absorption member 2F. As a result, according to the shock absorption device 100F of the third embodiment, similarly to the first embodiment, the deformation of the side frame 200 is suppressed in the case of light collision and the repairability of the vehicle can be improved while the occupant is reliably protected from the shock due to the collision.

Note that in the above-described examples, the connection state of the outer connection portion C2 of the frame-side connection portion C1 and the outer connection portion C2 is switchable. However, the present disclosure is not limited thereto. The connection state of the frame-side connection portion of the frame-side connection portion and the outer connection portion may be switchable. In addition, the degree of shock absorption in the case of heavy collision may be adjusted in multiple stages by predicting the degree of collision and selecting a drive unit to be actuated from a plurality of drive units 35.

Others

While embodiments of the shock absorption device according to the present disclosure have been described above, each aspect disclosed in the present specification can be combined with any other features disclosed in the present specification.

REFERENCE SIGNS LIST

1 First shock absorption member
2 Second shock absorption member
3 Switching unit
4 Control unit
5 Base portion
6 Reception portion
7 Hole forming portion (one example of contact portion)
8 Piston (one example of contact portion)
100 Shock absorption device
200 Side frame (one example of frame)
300 Bumper beam (one example of outer structure)

The invention claimed is:

1. A shock absorption device, comprising:
a first shock absorption structure provided between a frame forming a framework of a vehicle and an outer structure positioned outside of the frame in the vehicle, the first shock absorption structure being installed in a manner that the outer structure is deformed preferentially over the frame in a shock-receiving situation in which the outer structure is displaced or deformed toward a frame side due to a shock load against the outer structure;
a second shock absorption structure provided between the frame and the outer structure;
a switcher to switch an installation state of the second shock absorption structure between a first installation state in which the second shock absorption structure avoids the shock load in the shock-receiving situation and a second installation state in which the second shock absorption structure receives the shock load in the shock-receiving situation and deforms together with the first shock absorption structure;
a base portion provided at the frame in a manner that the base portion fixes the first shock absorption structure;
a reception portion opening at the base portion, the reception portion being configured to receive the second shock absorption structure that is in the first installation state in the shock-receiving situation, to allow the second shock absorption structure to move toward the frame side, and thus to cause the second shock absorption structure to avoid the shock load; and
a contact portion provided at the base portion, the contact portion being configured to come into contact with the second shock absorption structure that is in the second installation state in the shock-receiving situation, and to restrict movement of the second shock absorption structure toward the frame side, and thus to cause the second shock absorption structure to receive the shock load,
wherein the contact portion is formed as a part of the base portion in a manner that the contact portion surrounds the reception portion.

2. The shock absorption device according to claim 1, wherein
the switcher displaces the second shock absorption structure with respect to the reception portion, and thus switches the second shock absorption structure between the first installation state and the second installation state.

3. The shock absorption device according to claim 1, wherein the switcher displaces the contact portion with respect to the reception portion, and switches the second shock absorption structure to the first installation state by disposing the contact portion at a first position where the second shock absorption structure is allowed to enter the reception portion and to the second installation state by disposing the contact portion at a second position where the second shock absorption structure is prevented from entering the reception portion.

4. The shock absorption device according to claim 1, wherein an outer shape of a cross section which is a cross section of the second shock absorption structure and orthogonal to a direction from an outer structure side toward the frame side is smaller than a size of a cross section of the reception portion at an end portion on the frame side, gradually increases in size toward the outer structure side, and is larger than the size of the cross section of the reception portion at an end portion on the outer structure side.

5. The shock absorption device according to claim 1, wherein the base portion is formed with a fragile portion, the fragile portion being configured to come into contact with the second shock absorption structure that is in the first installation state in the shock-receiving situation, to fracture by receiving a load from the second shock absorption structure, and thus to open the reception portion.

6. The shock absorption device according to claim 5, wherein an end portion of the second shock absorption structure on a side facing the base portion includes a contact region configured to come into contact with the fragile portion and a non-contact region configured not to come into contact with the base portion when the second shock absorption structure is at least in the first installation state in the shock-receiving situation.

7. The shock absorption device according to claim 1, wherein each of the first shock absorption structure and the second shock absorption structure is formed in a tubular shape extending from the frame side to the outer structure side, and the second shock absorption structure is installed inside the first shock absorption structure.

8. The shock absorption device according to claim 7, wherein a projecting portion protruding toward the first shock absorption structure is formed at an outer peripheral surface of the second shock absorption structure, and the second shock absorption structure is held by the first shock absorption structure when the projecting portion is engaged with an inner peripheral surface of the first shock absorption structure.

9. The shock absorption device according to claim 8, wherein when the second shock absorption structure is in the second installation state in the shock-receiving situation, the projecting portion guides the first shock absorption structure in a manner that the first shock absorption structure buckles along the second shock absorption structure.

10. A shock absorption device, comprising:
a first shock absorption structure provided between a frame forming a framework of a vehicle and an outer structure positioned outside of the frame in the vehicle, the first shock absorption structure being installed in a manner that the outer structure is deformed preferentially over the frame in a shock-receiving situation in which the outer structure is displaced or deformed toward a frame side due to a shock load against the outer structure;
a second shock absorption structure provided between the frame and the outer structure; and
a switcher to switch an installation state of the second shock absorption structure between a first installation state in which the second shock absorption structure avoids the shock load in the shock-receiving situation and a second installation state in which the second shock absorption structure receives the shock load in the shock-receiving situation and deforms together with the first shock absorption structure,
wherein when the second shock absorption structure is in the second installation state in the shock-receiving situation, the first shock absorption structure and the second shock absorption structure are installed in a manner that a timing at which deformation of the first shock absorption structure starts is different from a timing at which deformation of the second shock absorption structure starts.

11. The shock absorption device according to claim 10, wherein an end portion of the first shock absorption structure on the outer structure side is positioned closer to the outer structure side than an end portion of the second shock absorption structure on the outer structure side.

12. A shock absorption device, comprising:
a first shock absorption structure provided between a frame forming a framework of a vehicle and an outer structure positioned outside of the frame in the vehicle, the first shock absorption structure being installed in a manner that the outer structure is deformed preferentially over the frame in a shock-receiving situation in which the outer structure is displaced or deformed toward a frame side due to a shock load against the outer structure;
a second shock absorption structure provided between the frame and the outer structure; and
a switcher to switch an installation state of the second shock absorption structure between a first installation state in which the second shock absorption structure avoids the shock load in the shock-receiving situation and a second installation state in which the second shock absorption structure receives the shock load in the shock-receiving situation and deforms together with the first shock absorption structure,
wherein the second shock absorption structure extends in a manner that one end portion of the second shock absorption structure is connected to the frame and another end portion of the second shock absorption structure is connected to the outer structure,
one of a frame-side connection portion that is a connection portion between the second shock absorption structure and the frame and an outer connection portion that is a connection portion between the second shock absorption structure and the outer structure is configured to be disconnected by the switcher, and
when the second shock absorption structure is in the first installation state in the shock-receiving situation, the second shock absorption structure avoids the shock load when the connection of one of the frame-side connection portion and the outer connection portion is disconnected by the switcher, and
when the second shock absorption structure is in the second installation state in the shock-receiving situation, the second shock absorption structure receives the shock load when the connection of both the frame-side connection portion and the outer connection portion is maintained.

13. The shock absorption device according to claim 2, wherein an outer shape of a cross section which is a cross section of the second shock absorption structure and orthogonal to a direction from an outer structure side toward the frame side is smaller than a size of a cross section of the reception portion at an end portion on the frame side, gradually increases in size toward the outer structure side, and is larger than the size of the cross section of the reception portion at an end portion on the outer structure side.

14. The shock absorption device according to claim 3, wherein an outer shape of a cross section which is a cross section of the second shock absorption structure and orthogonal to a direction from an outer structure side toward the frame side is smaller than a size of a cross section of the reception portion at an end portion on the frame side, gradually increases in size toward the outer structure side, and is larger than the size of the cross section of the reception portion at an end portion on the outer structure side.

15. The shock absorption device according to claim 2, wherein the base portion is formed with a fragile portion, the fragile portion being configured to come into contact with the second shock absorption structure that is in the first installation state in the shock-receiving situation, to fracture by receiving a load from the second shock absorption structure, and thus to open the reception portion.

16. The shock absorption device according to claim 3, wherein the base portion is formed with a fragile portion, the fragile portion being configured to come into contact with the second shock absorption structure that is in the first installation state in the shock-receiving situation, to fracture by receiving a load from the second shock absorption structure, and thus to open the reception portion.

17. The shock absorption device according to claim 1, wherein when the second shock absorption structure is in the second installation state in the shock-receiving situation, the first shock absorption structure and the second shock absorption structure are installed in a manner that a timing at which deformation of the first shock absorption structure starts is different from a timing at which deformation of the second shock absorption structure starts.

18. The shock absorption device according to claim 2, wherein when the second shock absorption structure is in the second installation state in the shock-receiving situation, the first shock absorption structure and the second shock absorption structure are installed in a manner that a timing at which deformation of the first shock absorption structure starts is different from a timing at which deformation of the second shock absorption structure starts.

19. The shock absorption device according to claim 3, wherein when the second shock absorption structure is in the second installation state in the shock-receiving situation, the first shock absorption structure and the second shock absorption structure are installed in a manner that a timing at which deformation of the first shock absorption structure starts is different from a timing at which deformation of the second shock absorption structure starts.

\* \* \* \* \*